US006195156B1

(12) United States Patent
Miyamoto et al.

(10) Patent No.: US 6,195,156 B1
(45) **Date of Patent: *Feb. 27, 2001**

(54) IMAGE FORMING DEVICE, IMAGE FORMING PROCESS, AND PATTERN FORMING PROCESS, AND PHOTOSENSITIVE MATERIAL USED THEREIN

(75) Inventors: Hirohisa Miyamoto, Kamakura; Shuzo Hirahara, Yokohama; Yasushi Shinjo, Tokyo; Koichi Tsunemi, Chofu; Mitsunaga Saito, Ichikawa; Masahiro Hosoya, Okegawa, all of (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,079

(22) Filed: Mar. 13, 1998

(30) Foreign Application Priority Data

Mar. 14, 1997 (JP) ..... 9-060945
Aug. 29, 1997 (JP) ..... 9-234657

(51) Int. Cl.[7] ..... G03B 27/04; G03C 1/492
(52) U.S. Cl. ..... 355/85; 355/27; 355/40; 430/270.1
(58) Field of Search ..... 355/85, 27, 40; 430/270.1, 271.1

(56) References Cited

U.S. PATENT DOCUMENTS 4,004,924 * 1/1977 Vrancken et al. ..... 96/35
4,634,659 * 1/1987 Esumi et al. ..... 430/302
5,225,878 * 7/1993 Asano et al. ..... 355/219
5,504,559 * 4/1996 Ojima et al. ..... 355/211
5,943,535 * 8/1999 Watanabe ..... 399/239
5,948,591 * 9/1999 Vermeersch et al. ..... 430/270.1

OTHER PUBLICATIONS

Condensed Chemical Dictionary, by Richard J. Lewis, Sr p. 877 which gives definition of photocatalysis.*

Photocatalysis Fundamentals and Applications by Ezio Pelizzetti p. 2.*

* cited by examiner

*Primary Examiner*—Russell Adams
*Assistant Examiner*—Khaled Brown
(74) *Attorney, Agent, or Firm*—Finnegan, Henderson, Farabow, Garrett, & Dunner, L.L.P.

(57) ABSTRACT

The present invention provides an image forming process, an image forming device, and a pattern forming process intended to obtain an image by developing a latent image which has been formed by exposing to light a photosensitive material including a photocatalytic layer which includes a photocatalyst and a hydrophobic layer applied on top of said photocatalytic layer, or a photosensitive material including a hydrophobic photosensitive layer which includes a photocatalyst and an organic compound, wherein the photocatalyst, when exposed to light, changes the angle of contact with water in the area on the surface of the photosensitive material which is exposed to light, thereby differentiating from the angle of contact with water in the area which is not exposed to light. The present invention also provides an image forming device and an image forming process which enable on-demand printing and reduce effects on health and environment, as well as a pattern forming process which is simple and reduces the effects on health and the environment.

18 Claims, 10 Drawing Sheets

IMAGE FORMING DEVICE, IMAGE FORMING PROCESS, AND PATTERN FORMING PROCESS, AND PHOTOSENSITIVE MATERIAL USED THEREIN

FIELD OF INVENTION

The present invention relates to an image forming device. The present invention also relates to a photosensitive material and an image forming process used for said image forming device. Further, the present invention relates to a pattern forming process utilizing said photosensitive material.

BACKGROUND OF THE INVENTION

The conventional image forming device based on dry electrophotography, which uses toner particles, requires that the size of the toner particles used should be as small as possible to generate high-quality images. However, the use of fine toner particles has a practical disadvantage: particles with diameters of 5 to 6 μm or less may cause diseases such as pneumoconiosis when inhaled by operators while suspending in air, as they are not easily disintegrated once sucked into the lung. A possible solution to this problem is to use a developer in which toner is dispersed in organic solvent to prevent the particles from scattering in air. However, this method also may be problematic as the organic solvent used may evaporate while the toner is fixed on an image recording medium.

Although many printers for commercial applications use organic solvents, it may be replaced with water to reduce the effect on the environment. For these printers, however, an image needs to be impressed on a plate before being printed, hampering their applications in on-demand printing, unlike electrophotographic printing.

On the other hand, in the semiconductor industry, to form a pattern of metal layer, the remaining area needs to be masked, which is why the additional masking process and a mask removal process are necessary before and after metallic pattern forming, respectively. These processes are quite cumbersome and often involve the use of a strongly acidic mask remover, posing problems regarding the safety of operators and effects on the environment.

From the above viewpoint, an image forming device which would have little effect on operators and environment while enabling on-demand printing has been awaited in the fields of electrophotographic image forming and printing.

Also, in the semiconductor industry, a simpler, safer and environmentally less offensive metal pattern forming process have been called for.

SUMMARY OF THE INVENTION

The first image forming device according to the present invention is characterized by comprising:

(1) A photosensitive material comprising a photocatalytic layer comprising a photocatalyst and a hydrophobic layer applied on top of said photocatalytic layer, wherein said photocatalyst, when exposed to light, changes the angle of contact with water in the area on the surface of the photosensitive material which is exposed to light, thereby differentiating from the angle of contact with water in the area which is not exposed to light;

(2) An initializer for leveling the hydrophobic layer so as to level the angle of contact with water on the surface of said photosensitive material;

(3) An exposer for forming a latent image on said photosensitive material, which has been initialized by the initializer; and (4) A developing device for developing the formed latent image.

The second image forming device according to the present invention is characterized by comprising:

(1) A photosensitive material comprising a photocatalytic layer comprising a photocatalyst and a hydrophobic layer applied on top of said photocatalytic layer, wherein said photocatalyst, when exposed to light, changes the angle of contact with water in the area on the surface of the photosensitive material which is exposed to light;

(2) An initializer for leveling the hydrophobic layer so as to level the angle of contact with water on the surface of said photosensitive material;

(3) An exposer for forming a latent image on said photosensitive material, which has been initialized by the initializer, by exposing said photosensitive material to light capable of controlling the dose of light exposure; and (4) A developing device the formed latent image by supplying ink to the surface of said photosensitive material so as to adhere ink to said latent image.

The third image forming device according to the present invention is characterized by comprising:

(1) A photosensitive material comprising a photocatalytic layer comprising a photocatalyst and a hydrophobic layer applied on top of said photocatalytic layer, wherein said photocatalyst, when exposed to light, changes the angle of contact with water in the area on the surface of the photosensitive material which is exposed to light, thereby differentiating from the angle of contact with water in the area which is not exposed to light;

(2) An initializer for leveling the hydrophobic layer so as to level the angle of contact with water on the surface of said photosensitive material;

(3) An exposer for forming a latent image on said photosensitive material, which has been initialized by the initializer;

(4) A curing device for curing the hydrophobic layer in the area where the latent image is not formed; and (5) A developing device for developing the formed latent image.

The fourth image forming device according to the present invention is characterized by comprising:

(1) A photosensitive material comprising a hydrophobic photosensitive layer comprising a photocatalyst and an organic compound, wherein said photocatalyst, when exposed to light, changes the angle of contact with water in the area on the surface of the photosensitive material which is exposed to light, thereby differentiating from the angle of contact with water in the area which is not exposed to light;

(2) An exposer for forming a latent image on said photosensitive material, which has been initialized by the initializer; and (3) A developing device for developing the formed latent image.

The fifth image forming device according to the present invention is characterized by comprising:

(1) A photosensitive material comprising a hydrophobic photosensitive layer comprising a photocatalyst and an organic compound, wherein said photocatalyst, when exposed to light, changes the angle of contact with water in the area on the surface of the photosensitive material which is exposed to light, thereby differentiating from the angle of contact with water in the area which is not exposed to light;

(2) An exposer for forming a latent image on said photosensitive material, which has been initialized by the initializer, by exposing said photosensitive material to light, capable of controlling the dose of light exposure; and (3) A developing device the formed latent image by supplying ink to the surface of said photosensitive material so as to adhere ink to said latent image.

The sixth image forming device according to the present invention is characterized by comprising:

(1) A photosensitive material comprising a hydrophobic photosensitive layer comprising a photocatalyst and an organic compound, wherein said photocatalyst, when exposed to light, changes the angle of contact with water in the area on the surface of the photosensitive material which is exposed to light, thereby differentiating from the angle of contact with water in the area which is not exposed to light;

(2) An exposer for forming a latent image on said photosensitive material, which has been initialized by the initializer;

(3) A curing device for curing the hydrophobic layer in the area where the latent image is not formed; and (4) A developing device for developing the formed latent image.

The first photosensitive material according to the present invention is a photosensitive material comprising a photocatalytic layer comprising a photocatalyst and a hydrophobic layer applied on top of said photocatalytic layer, wherein the hydrophobic layer, when exposed to light, is degenerated so as to change the angle of contact with water in the area on the surface which is exposed to light, thereby differentiating from the angle of contact with water in the area which is not exposed to light.

The second photosensitive material according to the present invention is a photosensitive material wherein a photocatalyst for use with a photosensitive material is supported by a binder substance, said photocatalyst being such that a photosensitive-material comprising a photocatalytic layer comprising said photocatalyst and a hydrophobic layer applied on top of said photocatalytic layer, when exposed to light, changes the angle of contact with water in the area on the surface which is exposed to light, thereby differentiating from the angle of contact with water in the area which is not exposed to light.

The third photosensitive material according to the present invention is a photosensitive material comprising a hydrophobic layer comprising a photocatalyst and an organic compound, wherein the hydrophobic layer, when exposed to light, is degenerated so as to change the angle of contact with water in the area on the surface which is exposed to light, thereby differentiating from the angle of contact with water in the area which is not exposed to light.

The fourth photosensitive material according to the present invention is a photosensitive material wherein a photocatalyst for use with a photosensitive material is supported by a binder substance, an organic compound, or a mixture thereof, said photocatalyst being such that a photosensitive material comprising a hydrophobic photosensitive layer comprising said photocatalyst and an organic compound, when exposed to light, changes the angle of contact with water in the area on the surface which is exposed to light, thereby differentiating from the angle of contact with water in the area which is not exposed to light.

The first image forming process according to the present invention is characterized by comprising:

(1) Preparing a photosensitive material comprising a photocatalytic layer comprising a photocatalyst and a hydrophobic layer applied on top of said photocatalytic layer, wherein said photocatalyst, when exposed to light, changes the angle of contact with water in the area on the surface of the photosensitive material which is exposed to light, thereby differentiating from the angle of contact with water in the area which is not exposed to light;

(2) Leveling the angle of contact with water on the surface of said photosensitive material;

(3) Exposing said photosensitive material to light to form a latent image; and (4) Developing the formed latent image.

The second image forming process according to the present invention is characterized by comprising:

(1) Preparing a photosensitive material comprising a hydrophobic photosensitive layer comprising a photocatalyst and an organic compound, wherein said photocatalyst, when exposed to light, changes the angle of contact with water in the area on the surface of the photosensitive material which is exposed to light, thereby differentiating from the angle of contact with water in the area which is not exposed to light;

(2) Exposing said photosensitive material to light to form a latent image; and (3) Developing the formed latent image.

The first pattern forming process according to the present invention is characterized by comprising:

(1) Preparing a photosensitive material comprising a photocatalytic layer comprising a photocatalyst and a hydrophobic layer applied on top of said photocatalytic layer, wherein said photocatalyst, when exposed to light, changes the angle of contact with water in the area on the surface of the photosensitive material which is exposed to light, thereby differentiating from the angle of contact with water in the area which is not exposed to light;

(2) Leveling the angle of contact with water on the surface of said photosensitive material;

(3) Exposing said photosensitive material to light to form a latent image; and (4) Adhering aqueous solution containing metallic ion to the formed latent image to deposit metal or metal oxide.

The second pattern forming process according to the present invention is characterized by using, in lieu of the aforementioned photosensitive material for use in the first pattern forming process, a photosensitive material comprising a hydrophobic photosensitive layer comprising a photocatalyst and an organic compound, wherein said photocatalyst, when exposed to light, changes the angle of contact with water in the area on the surface of the photosensitive material which is exposed to light.

The present invention provides an image forming device and an image forming process which enable on-demand printing and reduce the effects on health and environment.

Also, the present invention provides a pattern forming process which is simple and reduces the effects on health and environment.

DETAILED DESCRIPTION OF THE INVENTION

One of the image forming processes by the image forming device according to the present invention is described below, by referring to FIG. 2.

Figure 1:
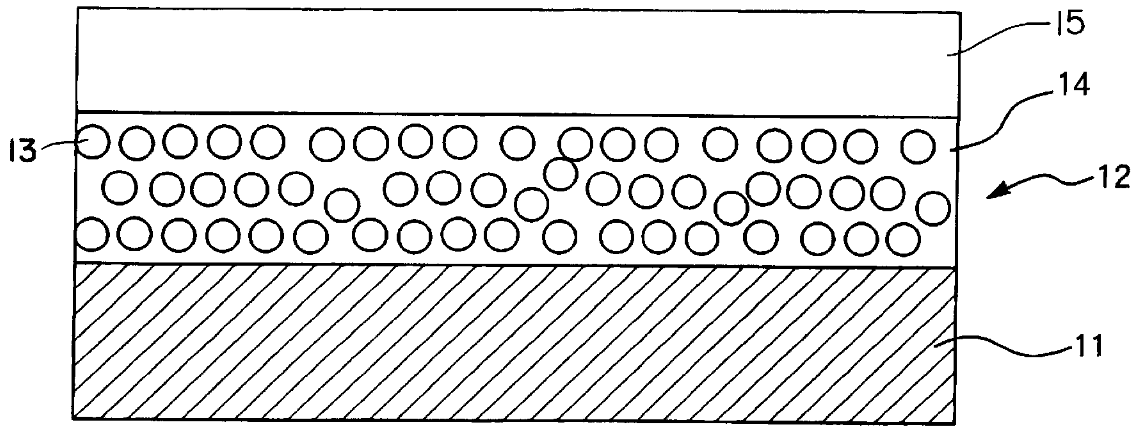
FIG. 1 is a schematic sectional view of the photosensitive material according to the present invention.

First, a substrate having a photocatalytic layer comprising photocatalyst is prepared. The substrate has a characteristic that, if the angle of contact with water on the surface of the substrate is leveled by forming a hydrophobic layer on the surface thereof (hereinafter referred to as "initialization"), followed by exposure to light, the angle of contact with water in the exposed area is changed by the photocatalytic effect, making the area less hydrophobic i.e., more hydrophilic (described later). The substrate 11 having a photocatalytic layer 12 and a hydrophobic layer 21 is hereinafter referred to as a "photosensitive material" (FIG. 1).

Figure 2:
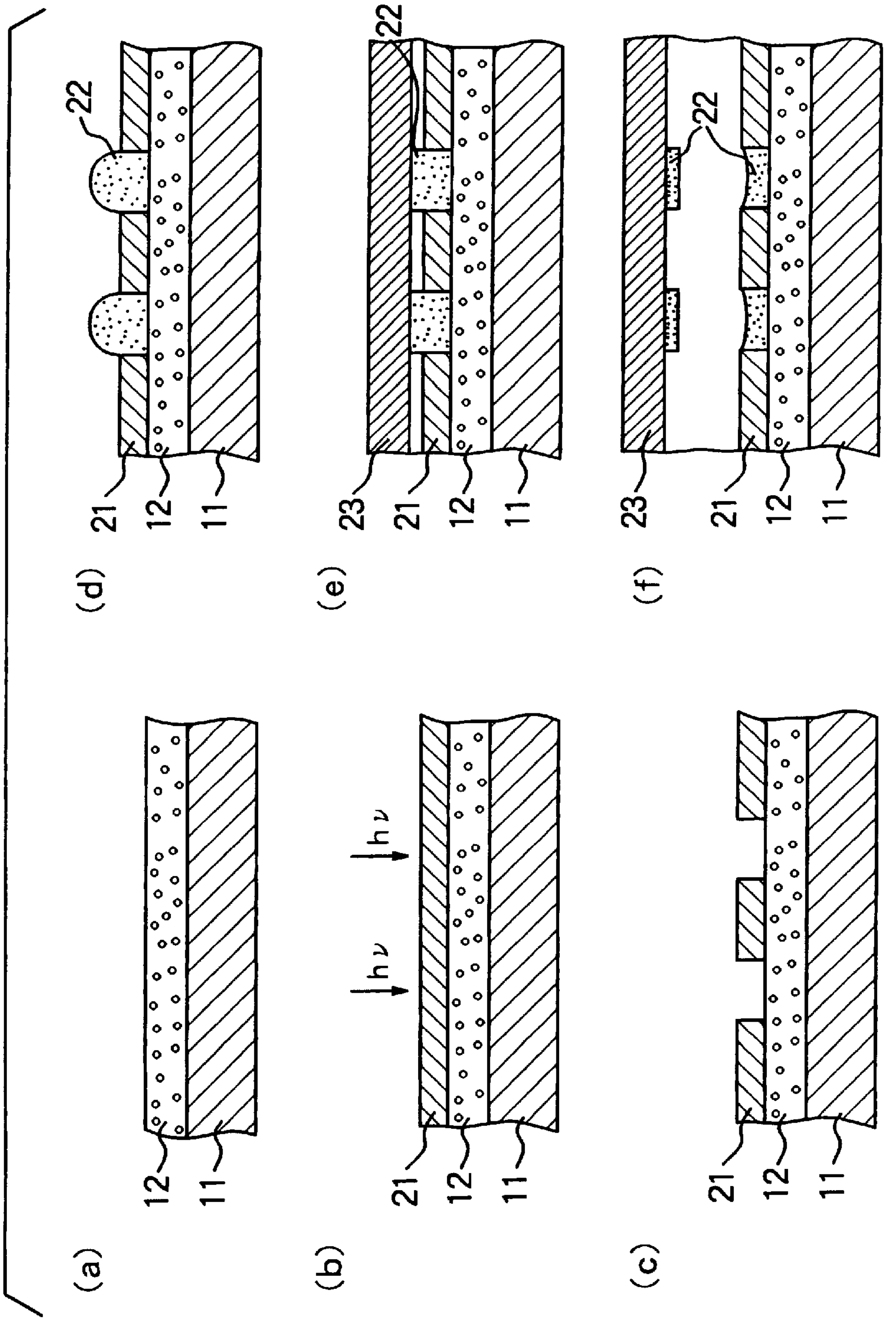
FIGS. 2(*a*)–2(*f*) are schematic diagram showing the image forming process by the image forming process according to the present invention.

After a hydrophobic layer is formed on the surface of the substrate (FIG. 2(*a*)) to make it a photosensitive material, its surface is initialized and exposed imagewisely to light (FIG. 2(*b*)). The area on the surface of the photosensitive material which is exposed to light becomes more hydrophilic as a result of a chemical change due to the photocatalytic effect, changing its angle of contact with water. The angle of contact and, thus, the hydrophilic property, changes continuously with the dose of light exposure.

In some cases, the hydrophobic substance which forms the hydrophobic layer may be lost due to chemical degeneration, as illustrated in FIG. 2(*c*), which shows a case where the hydrophobic layer has disappeared. As a result of these changes, a latent image is formed on the surface of the photosensitive material.

By supplying water-base ink to the photosensitive material, on which a latent image has been formed, the ink adheres imagewisely to the surface of the photosensitive material (FIG. 2(*d*)). The quantity of ink which adheres to the latent image changes with the hydrophilic property in the latent image.

By pressing an image forming medium, such as paper, against the photosensitive material, on which ink has adhered imagewisely (FIG. 2(*e*)), and peeling it off, the image, which has been formed on the photosensitive material by light, is transferred to the image recording medium as an inked image (FIG. 2(*f*)).

One of the image forming processes by the image forming device according to the present invention, as described above, may be understood in comparison with an electrophotographic process as follows: The hydrophilic transformation of the photosensitive material by exposure to light is interpreted as writing an electrostatic latent image to an electrophotographic photosensitive material, and the adhesion of water-base ink to the hydrophilic area as the adhesion of toner to the electrostatic latent image.

While water-base ink is used in the process described above, hydrophobic ink may also be used to form a negative image, following the area which has not been exposed to light.

This process is described in more details below by referring to FIG. 3:

First, a hydrophobic layer 32 is formed on the surface of the substrate 30 which has a photocatalytic layer, by using an initializing member (described later). FIG. 3A shows layer formation by the initializing member (initializing roller) 31. The formed hydrophobic layer is leveled as necessary by using a leveling member (described later).

The surface of the substrate, which has been covered with a hydrophobic layer, is exposed to light emitted by a light source 33 (i.e., an exposer; described later) to form a latent image. FIG. 3(*b*) shows light exposure in an image form using a mask 34. The exposed area 35 on the surface of the substrate becomes more hydrophilic by the effect of the photocatalyst; in other words, a latent image is formed on the exposed area 35.

Next, to facilitate the adhesion of water-base ink to the latent image area, or to remove the chemically changed hydrophobic substance from the latent image area, the substrate surface may be treated with a water roller or other means, if necessary.

Then, the image is developed by using a developing means. FIG. 3(*c*) shows development by supplying ink 37 to the substrate surface using an ink supplying member (ink roller) 36. Ink may be supplied by an ink roller as illustrated in FIG. 3(*c*), as well as a spray, a brush, or any other ink supplying method, or by immersing all or part of the exposed substrate directly in an ink reservoir, or by any other method as appropriate. In any case, adhesion of ink to the substrate is limited, for the most part, to the area of the substrate surface where the latent image has been formed. However, as some ink may adhere to the area where the latent image has not been formed, excess ink may be removed by using a squeezing member, if necessary. The squeezing member may be a squeezing roller made of an ink-absorbing material, a rubber blade for sweeping the ink, or any other member as appropriate.

After adhering ink to the area of the substrate surface where the latent image has been formed as described above, the ink is transferred to an image recording medium 38. The image recording medium on which to transfer the ink may be paper, as generally used, or cloth, as well as resin or metallic film whose surface has been processed to enhance the hydrophilic property, or any other medium as appropriate. The image recording medium 38 may be pressed against the substrate, as is often the case, by using a pressing roller, high pressure gas spray, electrostatic attraction, or any other method as appropriate.

Figure 3:
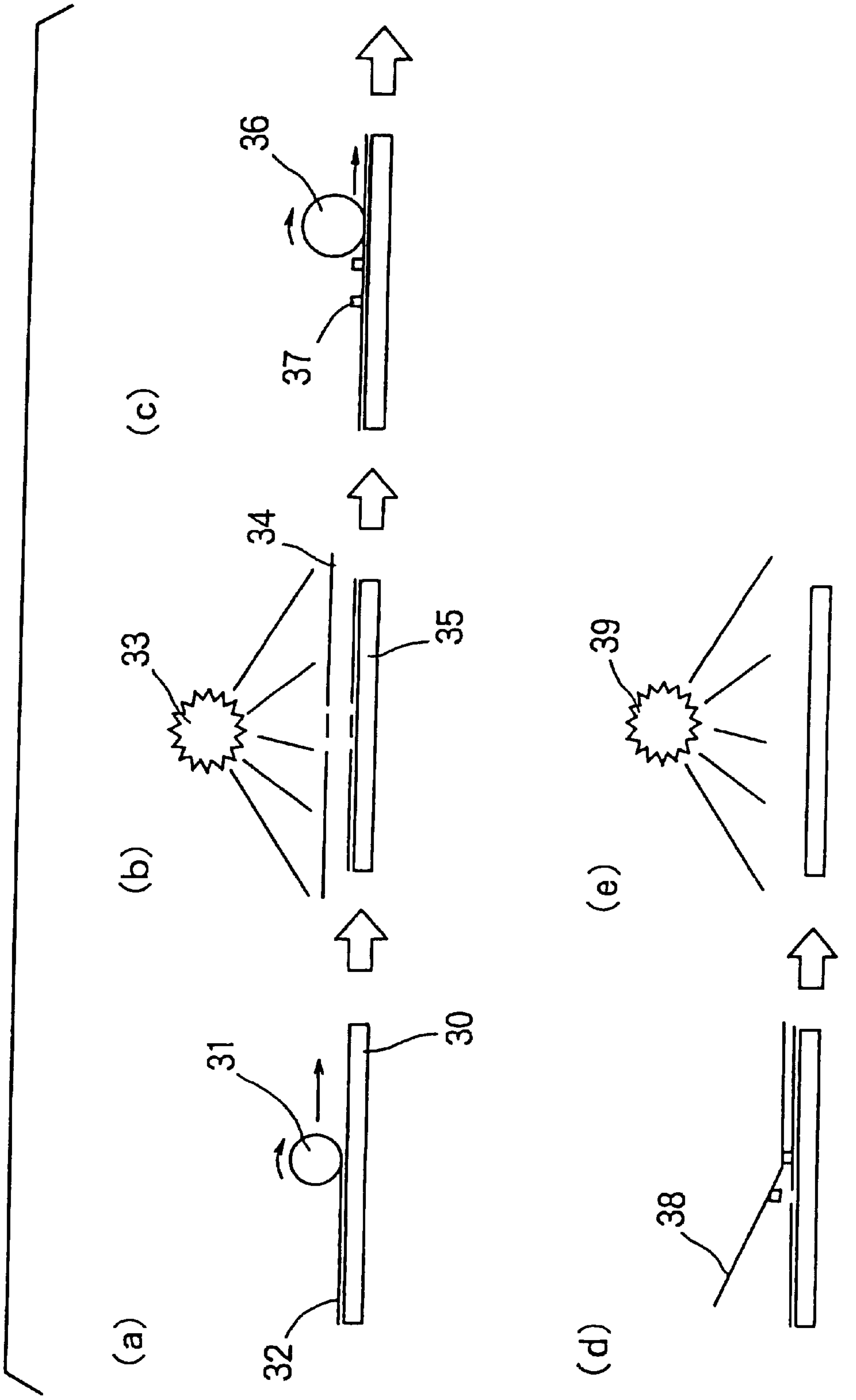
FIGS. 3(*a*)–3(*e*) and 4 are schematic views showing examples of the image forming device according to the present invention.

In an image forming device using a planar substrate as illustrated in FIG. 3, an image formed by one light exposure is generally reproduced on a number of image recording media. Therefore, in the example given in FIG. 3, the substrate after transfer generally repeats the step in FIG. 3(*c*), where it is supplied with ink, then the image transfer step in FIG. 3(*d*), where it transfers the image. The transfer step in FIG. 3(*d*) may be followed by a cleaning step, as necessary, to remove the ink adhering to the latent image or the ink adhering to the remaining area using a cleaning member. The cleaning member may be a cleaning roller made of an ink-absorbing material, a blade-shaped member designed for sweeping off the ink, or any other member as appropriate.

On the other hand, the substrate after ink transfer may be reinitialized to form a new image. In principle, the substrate can be immediately reinitialized (FIG. 3(*a*)) as it only has a hydrophobic layer after the transfer step. In practice, however, the substrate surface after the transfer step is divided into a hydrophilic area and a hydrophobic area. If the substrate is reinitialized immediately, the initializing member may fail to produce a hydrophobic layer of a uniform thickness. If the thickness of the hydrophobic layer is not uniform, the layer thickness cannot be controlled precisely according to a dose of light in the subsequent light exposure step for hydrophilic transformation, making it difficult to form a latent image in response to an input signal. For this reason, it is preferable to remove the hydrophobic layer as well, using a hysteresis erasing member (described later), before implementing the initializing step. FIG. 3(*e*) shows hysteresis erasing by light exposure using a light source 39.

The image forming device according to the present invention is a device for forming an image as described above, where the photosensitive material is not limited to a planar one. For on-demand applications, it is more beneficial to use a drum-shaped photosensitive material as described below to enable continuous image forming. An example of such image forming device which is capable of continuous image forming is described below by referring to FIG. 4. The image forming device shown in FIG. 4 comprises a plate drum 40 which is comparable to the substrate of the photosensitive material, an initializing member 42 having an initializer, a leveling member 43 having a levelizer, an exposing member 44 having an exposer, a water roller 45, an ink supplying member 46 having a developing means, a squeezing member 47, a pressing member 48, and a cleaning member 41.

A photocatalytic layer containing photocatalyst is formed on the surface of a drum (such as of aluminum) to make it a plate drum 30. The plate drum rotates as the image forming process proceeds. The following paragraphs describes how a given site on the surface of the plate drum is processed as the drum rotates.

A hydrophobic layer is formed at a given site of the plate drum, by the initializing member 32 (described later). The plate drum on which a hydrophobic layer has been formed is comparable to the photosensitive material as described above. The hydrophobic layer is leveled, if necessary, by the leveling member 43 (described later).

Then, the aforementioned site of the plate drum, on which a hydrophobic layer has been formed, is exposed to light emitted by a light source 44 (i.e., an exposer, described later) to form a latent image. Next, to facilitate the adhesion of water-base ink to the latent image area, or to remove the chemically changed hydrophobic substance from the latent image area, the surface of the aforementioned site of the plate drum is treated with a water roller 45.

Figure 4:
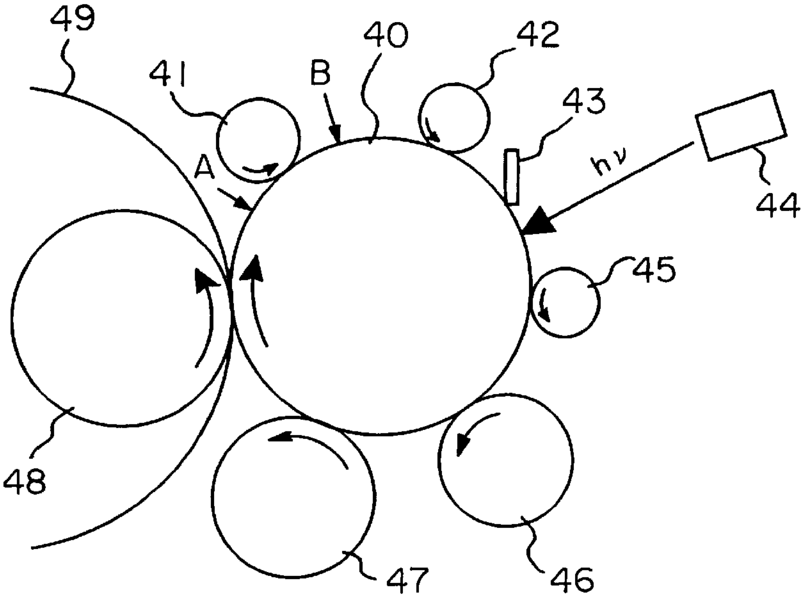

Then, ink is supplied to the surface of the aforementioned site of the plate drum, by the ink supplying member 46. Ink may be supplied via an ink roller as shown in FIG. 4, as well as a spray, a brush, or any other ink supplying method, or by immersing part of the plate drum directly in an ink reservoir, or by any other method as appropriate. In any case, most of the ink adheres to the area on the surface of the aforementioned site of the plate drum where the latent image has been formed. However, as some ink may adhere to the area where the latent image has not been formed, excess ink may be removed by using a squeezing member 47, if necessary. The squeezing member may be a squeezing roller made of an ink-absorbing material, a rubber blade for sweeping the ink, or any other member as appropriate.

After adhering ink to the area on the surface of the plate drum where the latent image has been formed as described above, the ink is transferred to an image recording medium 48. The image recording medium on which to transfer the ink may be paper, as generally used, or cloth, as well as resin or metallic film whose surface has been processed to enhance the hydrophilic property, or any other medium as appropriate. The image recording medium 48 may be pressed against the plate drum by using a pressing member 49 such as a pressing roller as illustrated in FIG. 4, or high pressure gas spray, electrostatic attraction, or any other method as appropriate.

In a device intended for continuous image forming as illustrated in FIG. 4, the aforementioned site of the plate drum is generally reinitialized to serve for further image forming after the ink is transferred from the plate drum to the image recording medium. As some ink may fail to transfer to the image recording medium and remains on the surface of the plate drum, the excess ink may be removed by using a cleaning member 41, if necessary, before reinitialization. The cleaning member may be a cleaning roller made of an ink-absorbing material, a blade-shaped member designed for sweeping off the ink, or any other member as appropriate.

In principle, the plate drum can be immediately reinitialized as it only has a hydrophobic layer after the transfer step. In practice, however, the surface of the plate drum after the transfer step is divided into a hydrophilic area and a hydrophobic area. If the plate drum is reinitialized immediately, the initializing member may fail to produce a hydrophobic layer of a uniform thickness. If the thickness of the hydrophobic layer is not uniform, the layer thickness cannot be controlled precisely according to a dose of light in the subsequent light exposure step for hydrophilic transformation, making it difficult to form a latent image in response to an input signal. For this reason, it is preferable to remove the hydrophobic layer as well, using a hysteresis erasing member (described later), before implementing the initializing step.

The cleaning member and the hysteresis erasing member may be applied at any desired positions between the site where ink is transferred from the plate drum and the site where initialization takes place. Also, several cleaning members and/or hysteresis erasing members may be provided.

If necessary, a member having the capabilities of both a cleaning member and a hysteresis erasing member, which can simultaneously remove the remaining ink and the hydrophobic layer, may be used.

After the aforementioned site is treated by the cleaning member and/or the hysteresis erasing member (when a cleaning member and/or a hysteresis erasing member is provided), the plate drum is reinitialized by the initializing member to form a hydrophobic layer at the site of the plate drum. This completes the first cycle.

In an image forming device as describe above, a different image can be formed every time the above cycle is repeated, as is the case in a typical photocopier. To form the same image a number of times, as in a typical printer, the initializing, leveling and exposing steps are unnecessary in the second and subsequent cycles and, therefore, may be omitted.

To enable the same image to be formed a number of times, it is preferable that the latent image be as durable to printing as possible. Durability to printing may be attained by curing the hydrophobic layer. The curing step (described later) is generally implemented between the exposing step and the developing step. The curing step may be omitted in the second and subsequent cycles or repeated intermittently.

In another mode of the image forming device according to the present invention, the photosensitive material may be a photosensitive material consisting of a hydrophobic photosensitive layer comprising a photocatalyst and an organic compound, wherein the hydrophobic photosensitive layer, when exposed to light, is degenerated so as to change the angle of contact with water in the area on the surface which is exposed to light, thereby differentiating from the angle of contact with water in the area which is not exposed to light (described later). Such a photosensitive material may be used in the foregoing image forming device to form an image in the same process as above, except that the photocatalytic layer changes its own hydrophobic property.

In one of the photosensitive materials according to the present invention, a hydrophobic layer 15 is applied on top of a photocatalytic layer 12, which is applied on the substrate 11 and comprises a photocatalyst 13 and a binder substance 14 supporting the photocatalyst. FIG. 1 schematically shows the sectional view.

The photosensitive material is initialized prior to image formation. In the initializing step, the hydrhobic layer on the surface of the photosensitive material is leveled. When the photosensitive material, on which a hydrophobic layer is formed, is exposed to light in an image form, the angle of contact with water is differentiated between the exposed and non-exposed areas. This is induced by the effect of the photocatalyst, which chemically changes the surrounding hydrophobic substance, when exposed to light, to make it more hydrophilic. Although the mechanism of the chemical change is not clear, it is generally understood that positive holes which are isolated by the excitation of the photocatalyst under light exposure helps generate active oxygen and active hydrogen, which then react with surrounding organic substances.

For the purpose of the present invention, any photocatalyst may be used provided that it functions as described above. More specifically, $TiO_2$, $SnO_2$, $WO_3$, $V_2O_5$, $Nb_2O_5$, $Ta_2O_5$, $Fe_2O_3$, $SrTiO_3$, CdS, ZnS, PbS, CdSe, GaP and other photocatalysts, or a mixture of several photocatalysts, as necessary, may be used.

Although any photocatalyst may be used as mentioned above, $TiO_2$ is the most preferable for high sensitivity and little effect on environment and health. Any of the known types of $TiO_2$ may be used as appropriate, such as rutile or anatase. The secondary particle size of $TiO_2$ used as photocatalyst should preferably range from 10 nm to 5 $\mu$m as measured under a transmission electron microscope for optimal photocatalytic activity.

The binder substance 14 that supports the photocatalyst on the substrate may be: (a) a metal oxide such as $SiO_2$, $Al_2O_3$, $In_2O_3$, MgO, $ZrO_2$, $Y_2O_3$, $SnO_2$, $Cr_2O_3$, $La_2O_3$, etc.; (b) a carbide such as SiC, WC, TiC, etc.; (c) an inorganic substance, whose typical examples are nitride ceramics such as $C_3N_4$, $Si_3N_4$, BN, TiN, etc.; or (d) an organic substance, such as polycarbonate resin, phenol resin, nylon resin, silicone resin, siloxane resin, epoxy resin, polyethylene resin, polyester resin, vinyl alcohol resin, polyacrylate resin, butyral resin, polyvinyl acetal resin, vinyl acetate resin, diallyl phthalate resin, polystyrene resin, polysulfone resin, acrylic resin, polyphenylene oxide resin, alkyd resin, styrene-butadiene copolymer resin, styrene-maleic anhydride copolymer resin, urethane resin, and other polymers.

The binder substance may be any of these substances as appropriate or, as necessary, a mixture of these binders mixed at any appropriate ratio. It should be noted, however, that when an organic substance is used as the binder for the photocatalytic layer, the binder substance in the area of the photosensitive material which is exposed to light may undergo a chemical change. If the same image is to be reproduced repeatedly from the exposed photosensitive material, the image forming purpose is sufficed as long as the exposed area has a desired hydrophilic property. However, if a different image is to be formed each time, as in a photocopier, the photocatalytic layer of the photosensitive material should be restored once the inked image is transferred to an image recording medium. For these applications, the binder substance for the photocatalytic layer should be as resistant to chemical changes as possible, and definitely less prone to chemical changes than the hydrophobic layer which is formed on the surface of the photosensitive material by initialization. The most preferable binder substances are metal oxides, carbides, and nitride ceramics. The service life of the photosensitive material can be extended by using one of these binder substances if initialization and image forming are to be repeated.

The substrate 11 may generally be made of ceramic, metal, or other substance, preferably of metal although not restricted.

Metals can easily be formed to a hollow drum such as one for use as a plate drum as described above, for their mechanical strength and high workability. For example, a hollow drum 30 mm in outside diameter and 250 mm in length produced from aluminum would have a sufficient mechanical strength at a thickness as low as 1 mm. These properties of metals would help reduce the weights of individual parts and, thus, the total weight of an image forming device, enabling the production of a large-sized drum. Another advantage of metals over ceramics (e.g., glass) and other materials which require sintering is dimensional stability: they can be easily maintained at a constant diameter over length with little eccentricity, making it easy to form high-quality images.

Also, as metals are superb conductors, the high electron mobility of the metallic substrate helps prevent the photocatalyst in the photocatalytic layer on the surface of the substrate from being reduced by incoming electrons. The substrate may also be charged with a bias voltage or grounded, if necessary.

Also, metal surface is generally covered with an oxide film in air, which makes application of a hydrophobic layer easier. Further, if the hydrophobic layer is to be heated to dry after its application or after forming a latent image by light exposure, a metal substrate is advantageous as it would retain its dimensional stability at high temperatures (e.g., 300 to 350° C.) and be cooled swiftly for its high thermal conductivity.

Preferred metals to be used include commonly used ones such as aluminum, nickel, iron, copper or titanium, as well as their alloys such as stainless steel or Duralumin. The most preferable of them are aluminum and aluminum alloys for their light weight, high strength, and high workability.

The photosensitive material according to the present invention is generally prepared by coating the substrate 11 with an agent containing the aforementioned photocatalyst 13 and binder substance 14 to form a photocatalytic layer. Such agent is generally a solution or suspension of the aforementioned photocatalyst and, if necessary, the aforementioned binder substance in water or organic solvent such as alcohol (e.g., methanol) or aromatic solvent (e.g., toluene). There is no limitation to the mixing ratio of the photocatalyst and the binder substance in the agent. The mixing ratio of the photocatalyst and the binder substance may have to be adjusted according to the angle of contact with water in the exposed or non-exposed area, which may vary for different types of ink.

The agent containing the photocatalyst may be applied to the substrate by spin coating, dip coating, bar coating, spray coating, or any other method as appropriate.

Also, a mixture of the aforementioned binder substance and the aforementioned photocatalyst may be formed to a solid shape so that the photocatalytic layer works as a substrate.

Further, a photosensitive material may be prepared from a Ti substrate, for example, by chemically changing its surface to $TiO_2$.

The preferable thickness of the photocatalytic layer, which is formed as described above, is 0.01 to 100 $\mu$m, most preferably 0.05 to 10 $\mu$m for higher strength of the layer. A photocatalytic layer thinner than 0.01 $\mu$m may fail to distinguish the angle of contact with water between the exposed and non-exposed areas clearly, exhibiting what is generally called a "fog" in electrophotography. On the other hand, a photocatalytic layer thicker than 100 $\mu$m may cause problems such as inadequate strength or cracking of the layer.

The photocatalytic layer 12 may contain a sensitizer as necessary. A sensitizer enhances the sensitivity of the photocatalyst at a specific wavelength, as it is excited by absorbing light at that wavelength and transfers the excitation energy to the photocatalyst. Any type of sensitizer may be used, including aromatic sensitizers, such as pyrene, perylene, triphenylene, etc.; xanthene sensitizers such as rhodamine B, rose Bengal, etc.; cyanine sensitizers such as thiacarbocyanine, oxacarbocyanine, etc.; thiazine sensitizers such as thionine, methylene blue, toluidine blue, etc.; acridine sensitizers such as acridine orange, chloroflavin, acriflavin, etc.; phthalocyanine sensitizers such as phthalocyanine, metal phthalocyanines, etc.; porphyrin sensitizers such as tetraphenylporphyrin, metal porphyrins, etc.; chlorophyll sensitizers such as chlorophyll, chlorophyllene, chlorophyll with the central metal substituted, etc.; metal complex sensitizers such as ruthenium bipyridine complex, etc.; fullerene sensitizers such as $C_{60}$, $C_{70}$, etc.; hydrazone compounds, pyrazolene compounds, oxazole compounds, thiazole compounds, imino compounds, ketadine compounds, enamine compounds, amidine compounds, stilbene compounds, butadiene compounds, carbazole compounds, and other low-molecular-weight sensitizers; and high-molecular-weight sensitizers containing any of these low-molecular-weight compounds. In addition to the above, compounds used as charge generators or charge carriers for electrophotographic photosensitive materials may also serve as a sensitizer.

Any sensitizer may be used as appropriate and, if necessary, in combination. However, as a sensitizer is generally selected depending on the wavelength of the light used to form a latent image, metal porphyrins and ruthenium bipyridine are the most preferable.

The content of sensitizer used, though not restricted, is generally 0.001 to 1 mol. The content of sensitizer can be varied to control the performance of the photocatalytic layer.

Figure 5:
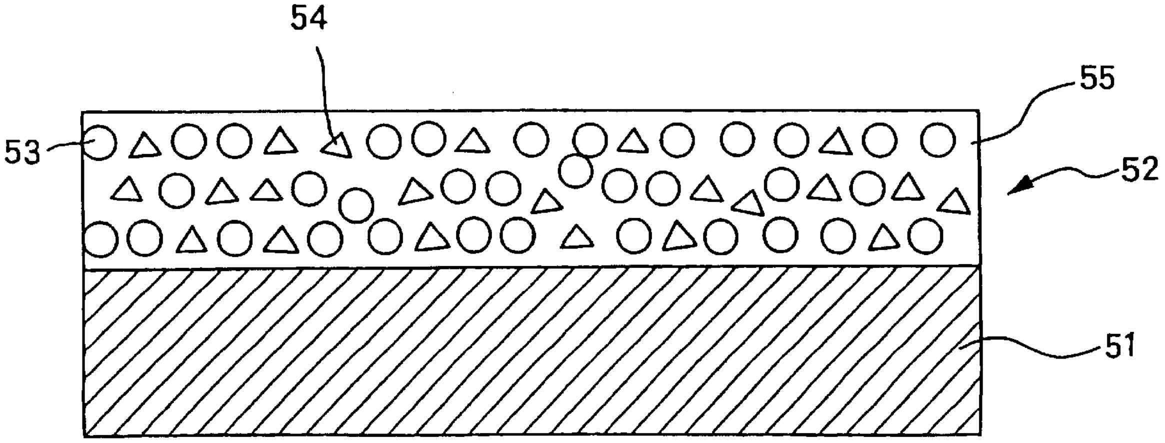
FIG. 5 is a schematic sectional view of the photosensitive material according to the present invention.

In another of the photosensitive materials according to the present invention, a hydrophobic layer 52 comprising a photocatalyst 53 and an organic compound 55 is applyed on the substrate 51. FIG. 5 schematically shows the sectional view. This photosensitive material contains photocatalyst within the hydrophobic layer which changes hydrophobic property when exposed to light. In other words, the photocatalyst 53 is not directly supported by the substrate 51, but is supported by the organic compound 54 which changes its hydrophobic property when exposed to light.

The substrate 51 may be the same as in the foregoing first photosensitive material. The type, content, particle size, etc., of the photocatalyst 53 are also the same as those for the foregoing first photosensitive material.

The organic compound 54 may be a substance which changes its hydrophobic property when exposed to light, specifically, organic compounds including: (a) polymers such as polycarbonate resin, phenol resin, nylon resin, silicone resin, siloxane resin, epoxy resin, polyethylene resin, polyester resin, vinyl alcohol resin, polyacrylate resin, butyral resin, polyvinyl acetal resin, vinyl acetate resin, diallyl phthalate resin, polystyrene resin, polysulfone resin, acrylic resin, polyphenylene oxide resin, alkyd resin, styrene-butadiene copolymer resin, styrene-maleic anhydride copolymer resin, urethane resin, etc.; (b) hydrocarbons such as paraffin, wax, etc.; (c) fatty acids, such as lauric acid, myristic acid, palmitic acid, oleic acid, stearic acid, linoleic acid, etc., and their derivatives such as amides, esters, etc.; and (d) higher aliphatic alcohols; (e) oil and fat containing carbons fewer than 100; and (f) silicone oil with the degree of polymerization below 200 (i.e., containing Si fewer than 200). Any of these organic substances may be used as appropriate and, as necessary, in a mixture at any mixing ratio as appropriate.

The photocatalytic layer 52 may contain a sensitizer as necessary. The type and content of sensitizer used are the same as those for the sensitizer used in the first photosensitive material.

The hydrophobic photosensitive layer containing the photocatalyst may be applied to the substrate by spin coating, dip coating, bar coating, spray coating, or any other method as appropriate.

The preferable thickness of the hydrophobic photosensitive layer, which is formed as described above, is 0.01 to 100 $\mu$m, most preferably 0.05 to 10 $\mu$m. A hydrophobic photosensitive layer thinner than 0.01 $\mu$m may fail to distinguish the angle of contact with water between the exposed and non-exposed areas clearly, exhibiting what is generally called a "fog" in electrophotography. On the other hand, a hydrophobic photosensitive layer thicker than 100 $\mu$m may cause problems such as inadequate strength or cracking of the layer.

<Initializer>

The initializer is a means for leveling the angle of contact with water on the surface of the photosensitive material. The angle of contact with water on the surface of the photosensitive material can be leveled by leveling the hydrophobic layer or the hydrophobic photosensitive layer on the surface of the photosensitive material. The term "hydrophobic layer" hereinafter refers generically to the meaning including both a hydrophobic layer and a hydrophobic photosensitive layer. Similarly, the term "hydrophobicity enhancer" refers to the meaning including those containing photocatalyst and organic compound as used in the second photosensitive material according to the present invention.

Any initializing member having the above function may be used as appropriate, such as those illustrated in FIGS. 6 through 10.

Figure 6:
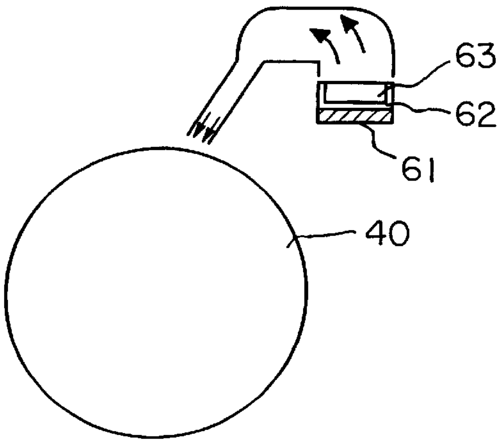
FIGS. 6 through 10 show examples of the initializing member according to the present invention.

The initializing member as shown in FIG. 6 is designed to spray hydrophobicity enhancer in a mist. The ultrasonic oscillator 61 atomizes the hydrophobicity enhancer 63 which is stored in the hydrophobicity enhancer reservoir 62 to spray it onto the plate drum 40. Spraying the hydrophobicity enhancer in a mist as in this example is advantageous in forming a thin and uniform layer.

Figure 7:
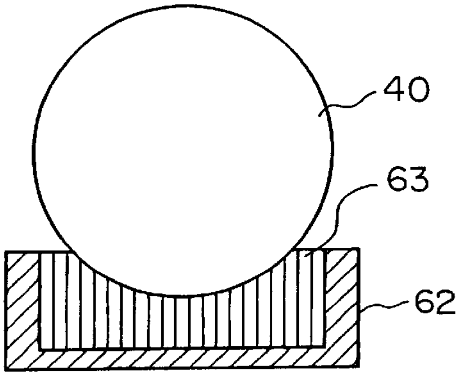

The initializing member as shown in FIG. 7 is designed to immerse the plate drum in the hydrophobicity enhancer 63 which is stored in the hydrophobicity enhancer reservoir 62 to form a layer of hydrophobicity enhancer. A layer formed by this method is relatively thick. Hydrophobicity enhancer for use with an initializing member of this design is generally liquid under normal temperature and humidity conditions.

Figure 8:
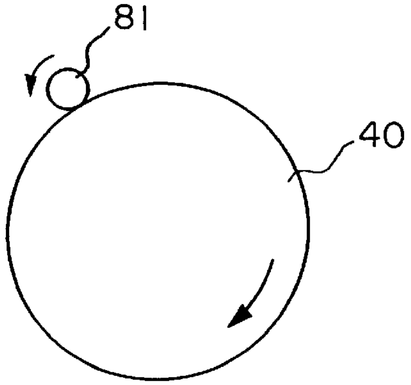

The initializing member as shown in FIG. 8 is designed to supply the hydrophobicity enhancer to the plate drum via the intermediate vehicle 81 which contains or carries the hydrophobicity enhancer. FIG. 8 shows an example where the intermediate vehicle is a roller, which has an advantage in avoiding deterioration as it contacts the plate drum at one point while rotating about its axis. However, an intermediate vehicle other than a roller may also be used.

Figure 9:
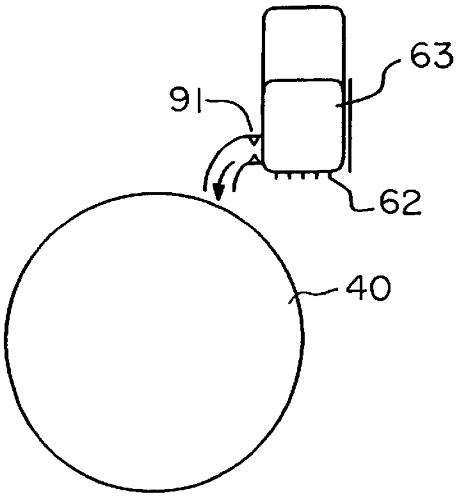

The initializing member as shown in FIG. 9 is designed to supply the hydrophobicity enhancer 63 by applying it from the hydrophobicity enhancer reservoir 62 to form a layer of hydrophobicity enhancer on the plate drum. A layer formed by this method is relatively thick as in the example shown in FIG. 7.

Figure 10:
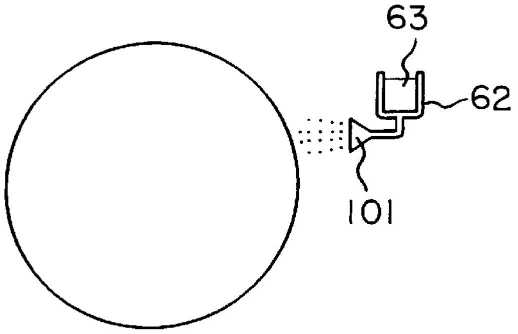

The initializing member as shown in FIG. 10 is designed to spray the hydrophobicity enhancer through the spray nozzle 101 onto the plate drum 40. This method is advantageous in forming a thin and uniform layer as in the example shown in FIG. 6.

While the hydrophobic layer on the plate drum can be leveled by any of these procedures, the thickness of the hydrophobic layer affects the performance such as image quality. The thickness of the hydrophobic layer is generally 0.01 to 10 $\mu$m. Provided that the layer thickness falls in this range, a thinner layer would be able to make the interval between image forming and initialization shorter, and a thicker layer would make the control of shades image by a dose of light easier. If the layer thickness is out of the above range, a layer of 0.01 $\mu$m or thinner may fail to distinguish the angle of contact with water between the exposed and non-exposed areas clearly, making it difficult to produce a clear image, and a layer of 10 $\mu$m or thicker may cause low sensitivity.

In consideration of the above, a suitable initializing member can be selected to obtain a desired hydrophobic layer. It is also possible to first form a relatively thick hydrophobic layer and, then, make it thinner using the levelizer which is described later.

<Levelizer>

The levelizer is a means for further thinning the hydrophobic layer which has been leveled by the initializer, and for leveling the surface of the hydrophobic layer which has been initialized by the initializer if it is not smooth enough. The levelizer having these functions is provided, if necessary and if provided, any levelizer may be used as appropriate, such as those illustrated in FIGS. 11 through 14.

Figure 11:
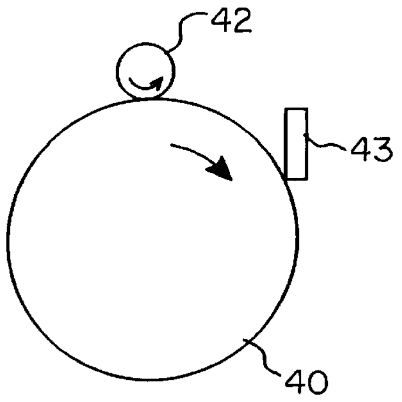
FIGS. 11 through 14 show examples of the leveling member according to the present invention.

The levelizer as shown in FIG. 11 is designed to apply the edge of a blade-shaped member, which has a sweeping function, to facilitate the formation of a thin layer. Close contact with the plate drum is assured to form a consistent thickness of layer if the member is made of an elastic material.

Figure 12:
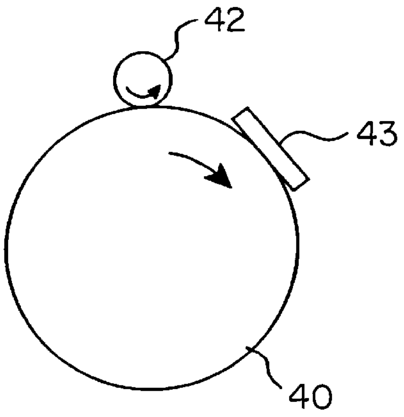
Figure 13:
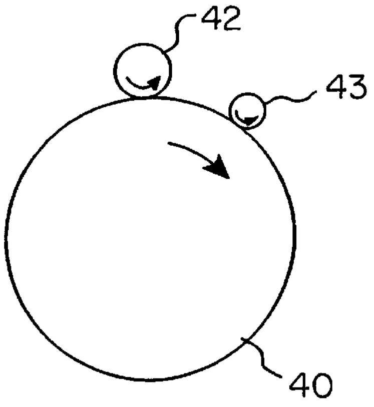

The levelizer as shown in FIGS. 12 and 13 is designed to apply the face of a member to the plate drum. Although its sweeping function is not as effective as that of the leveling member shown in FIG. 11, stability is higher as the change in contact area due to the wear of the leveling member is moderate. Using an elastic material for the member would bring about the same advantage as in the example shown in FIG. 11. The roller-shaped member as shown in FIG. 13 is particularly advantageous in avoiding contact at a single point, which may accelerate the wear of the member, as the member is rotatable about its axis.

Figure 14:
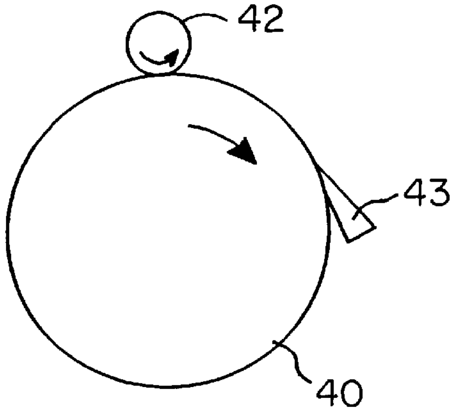

The levelizer as shown in FIG. 14 is designed to apply the edge of a blade-shaped member to remove excess hydrophobicity enhancer in the direction of rotation. Although its advantage is similar to that of the leveling member as shown in FIG. 11, the difference in sweeping performance may make it worth considering.

In addition to the above, foamed materials such as sponge may be used as the leveling member so that it absorbs the hydrophobicity enhancer to form a thinner hydrophobic layer.

The exposer used in the present invention is a means for exposing the photosensitive material, which has been initialized, to light to form a latent image. Any exposing member (i.e., a light source) having this function may be used, including the commonly used (a) laser such as gas laser, solid state laser, liquid laser, semiconductor laser, dye laser, etc.; and (b) phosphor head such as ZnO phosphor head, $SnO_2$ phosphor head, (ZnCd)S phosphor head, ZnS phosphor head, etc. When a phosphor head is used, a conductor such as $In_2O_3$ may be mixed to lower the operating voltage.

The type of the light source used as the exposer is generally selected depending on the absorption wavelength of the photocatalyst or the sensitizer applicable to the photocatalyst for which the light source is to be used, the intensity of the light source, and other conditions. It is preferable, however, that the wavelength of the emitted light be 400 to 800 nm as this range is easily attained by commonly used light sources. Also, the use of a high-energy laser is preferable in some cases because degeneration of the organic substance by heat and ablation is expected, in addition to photocatalytic degeneration as previously described.

In the image forming device according to the present invention, the angle of contact with water on the surface of the photosensitive material varies continuously with the dose of light exposure. Therefore, the intensity of the light source and/or the duration of light exposure may be adjusted as appropriate to control the hydrophilic property of the photosensitive material in the area where a latent image is formed and, thus, control the quantity of ink which adheres to the photosensitive material in the area where a latent image is formed, thereby regulating the shades of the image.

The curing device according to the present invention is a means for curing the area of the hydrophobic layer where a latent image has not been formed by the exposer, in order to improve the durability to printing. Any method may be used for curing the hydrophobic layer, such as the method to cure the organic substance constituting the hydrophobic layer, the method to selectively cover the area of the hydrophobic layer where a latent image has not been formed with a curable substance, then cure the curable substance, and other methods. Among these methods, it is preferable to use the method to selectively cover the area of the hydrophobic layer where a latent image has not been formed with a curable substance, then cure the curable substance.

Also, any method may be used for curing the substance as appropriate, such as curing by heating, curing by photoreaction under light exposure, curing by the supply of a substance which induces or accelerates the curing reaction to the curable substance, and other methods. Among these methods, it is preferable to use the method of curing by photoreaction under light exposure.

Any curable substance may be used provided that it can be cured by a method which is practicable in the process according to the present invention. When using a substance which cures by light exposure, it is preferable that its transmittance at the wavelength of the light to which it is exposed be as high as possible. Any substance meeting this criterion may be used, such as a substance which cures by itself through photoreaction, a mixture of a photopolymerization initiator and a monomer which cross-links by the effect of the photopolymerization initiator, and other substances. Specifically, acryloyls (e.g., acrylamides, acrylates such as phenylenediacrylates, etc.), unsaturated polyesters, unsaturated polyurethanes, azides, diazo compounds, etc., may be used.

When using the method to selectively cover the area of the hydrophobic layer where a latent image has not been formed with a curable substance, then cure the curable substance, any method may be used as appropriate for supplying the curable substance to the hydrophobic layer, including the method used for initialization as previously described. Therefore, the member for supplying the curable substance may have the same construction as that used for initialization as previously described. Also, the supplied curable substance may be leveled on the hydrophobic layer by any method as appropriate, including the one used for initialization as previously described. Therefore, the member for leveling the curable substance on the hydrophobic layer may have the same construction as that used for initialization as previously described. It should be noted that the curable substance need not have a close-packed layer structure; in other words, part of the hydrophobic layer may be exposed on the surface. Therefore, the curable substance may cover the hydrophobic layer in a mesh form or be irregularly scattered on the surface of the hydrophobic layer.

An exposing light source of any shape may be used to induce the curing reaction, provided that the light source does not form a latent image and can emit light at a wavelength which can induce the curing reaction, such as one selected from those used for light exposure as previously described.

The developing device used for the present invention is a means for developing a latent image which has been formed by the exposer. Although any developing member having this function may be used as appropriate, it is preferable to use an ink supplying means which applies ink to the exposed photosensitive material.

Any method may be used to supply ink to the surface of the photosensitive material, including one which has the same construction as the initializer as previously described. Also, although any ink may be used, it is preferable that the content of organic solvent be as low as possible, considering the effect on the environment.

The hysteresis erasing means according to the present invention is a means for removing the hydrophobic layer remaining on the surface of the photosensitive material after the ink which has adhered to the surface of the photosensitive material has been transferred to the image recording medium. The hysteresis erasing step using this means is comparable to the discharging member in the electrophotographic process.

Any hysteresis erasing means having this function may be used provided that it can remove the hydrophobic layer remaining on the substrate. Specifically, a mechanical type such as a blade-shaped squeezing member, which may also have a cleaning function to remove remaining ink, a chemical type which degenerates the hydrophobic layer consisting of organic substances by light exposure, heating, etc., and other types may be used. Among these, a chemical type which degenerates the hydrophobic layer consisting of organic substances, particularly by light exposure, is preferable.

Any light source may be used as a hysteresis erasing member for removing the hydrophobic layer by light exposure, such as a mercury lamp, a sodium lamp, a metal halide lamp, a halogen lamp, a fluorescent lamp, an incandescent lamp, an ultraviolet lamp, a laser, an LED illuminant, an EL illuminant, a photoluminescence illuminant, a cathode luminescence illuminant, etc. Among these, a laser is preferable for its coherent light emission, such as gas lasers using He—Ne, $CO_2$—$N_2$, He—Cd, $N_2$, Ar, Kr, $F_2$, ArF, KrF, XeCl, XeF, etc.; dye lasers using 2,5-diphenyloxazole, 4-methylamberiferon, etc., and other liquid lasers; ruby laser, YAG laser, and other solid state lasers; and semiconductor lasers.

When using a light source for light exposure as a hysteresis erasing member, any method may be used for exposing the photosensitive material to light, such as ones illustrated in FIGS. 15 through 18.

Figure 15:
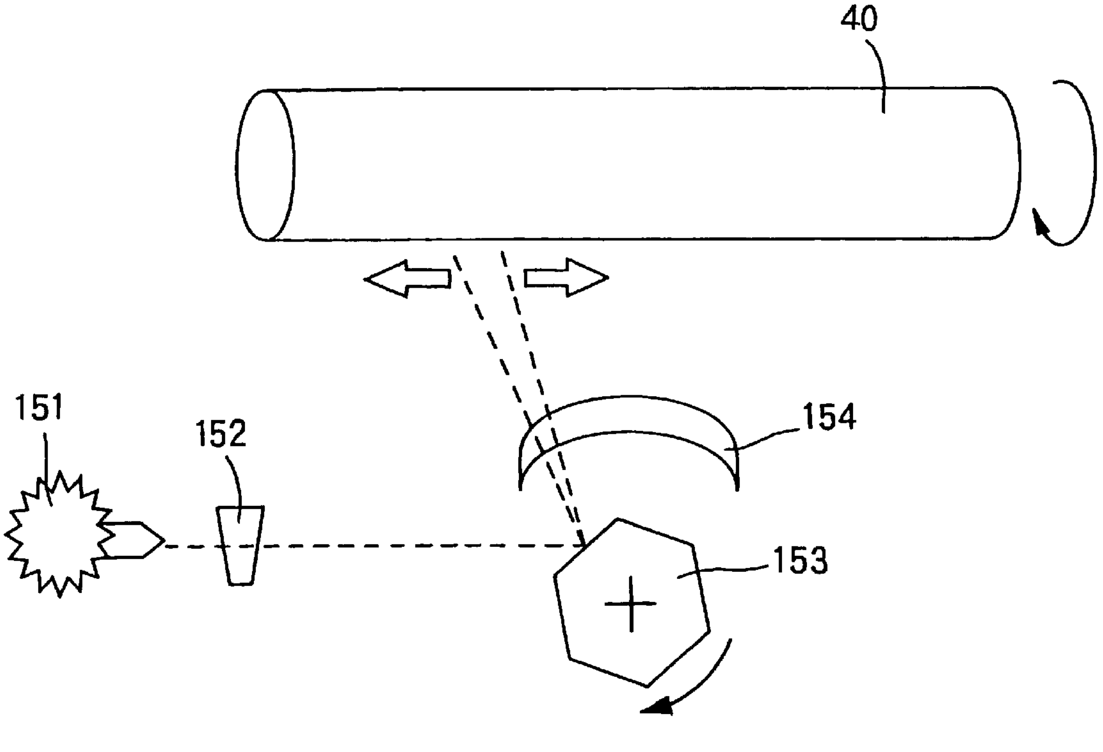
FIGS. 15 through 18 show examples of the hysteresis erasing member according to the present invention.

The hysteresis erasing means as shown in FIG. 15 is designed to expose the plate drum along its length to light emitted by the light source 151 via a polygon mirror 153. A lens 152 and an fθ lens 154 may be provided, if necessary.

Figure 16:
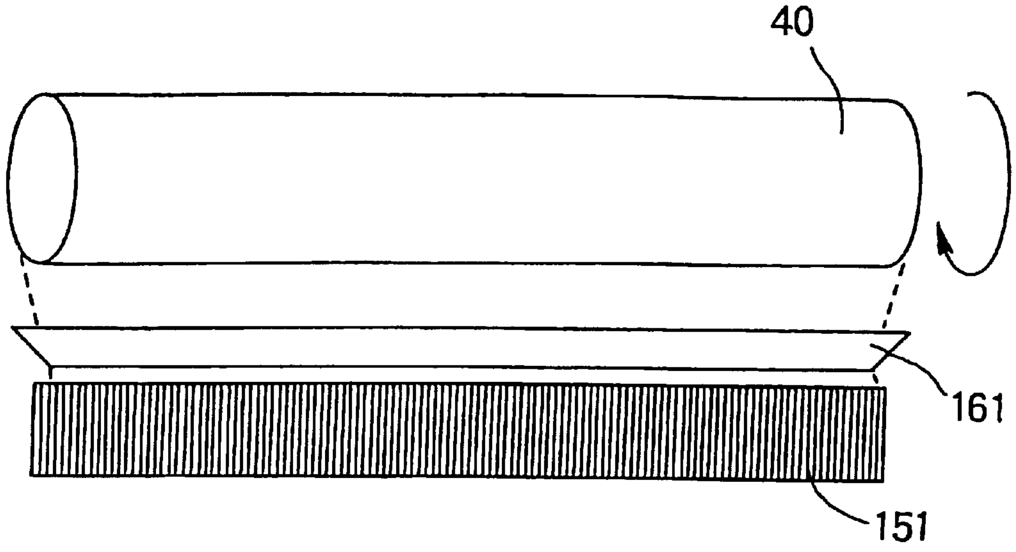
Figure 17:
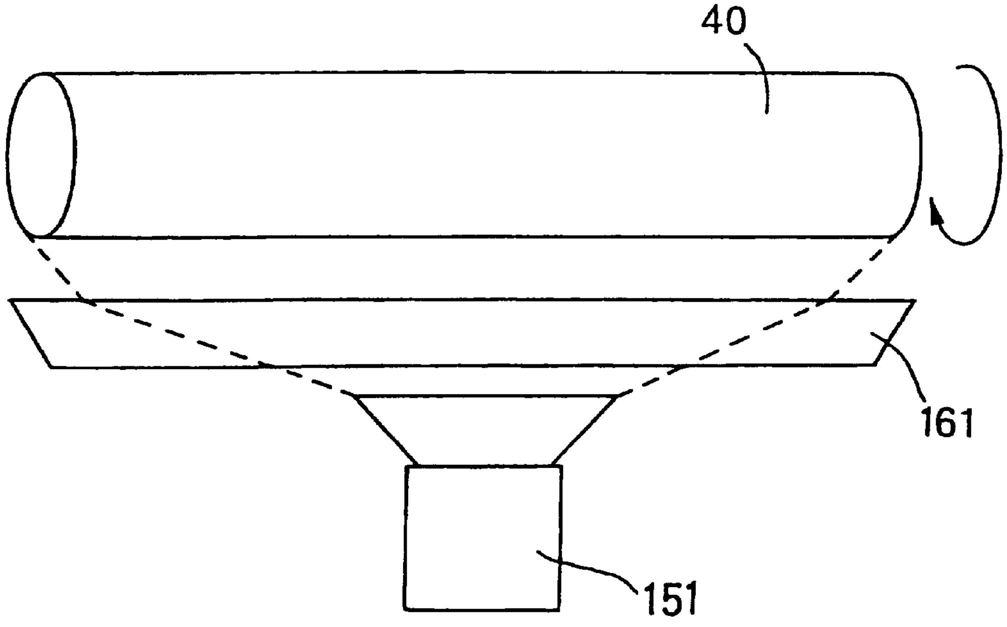

The hysteresis erasing means as shown in FIGS. 16 and 17 is designed to expose the plate drum uniformly along its length to light emitted by the light source via a lens 161.

Figure 18:
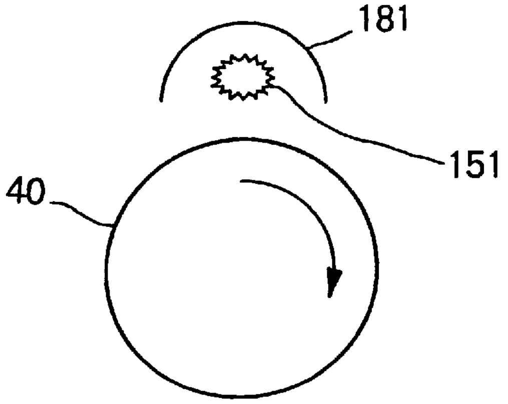

The hysteresis erasing means as shown in FIG. 18 is designed to expose the plate drum uniformly along its length to light emitted by the light source 151 via a reflector 181 which condenses the light.

In addition to the above, surface-emission type optical fibers may be used to transmit light emitted by a light source such as a laser, in order to expose the plate drum uniformly along its length, or a type of illuminant may be arranged equidistantly along the length of the plate drum for light exposure. Also, higher harmonics generated through a non-linear material from light emitted by a type of light source as previously described may be used to expose the plate drum. Also, light pulses such as electronic flash light emitted by a xenon tube which is excited at a high voltage may be used for exposure.

Figure 19:
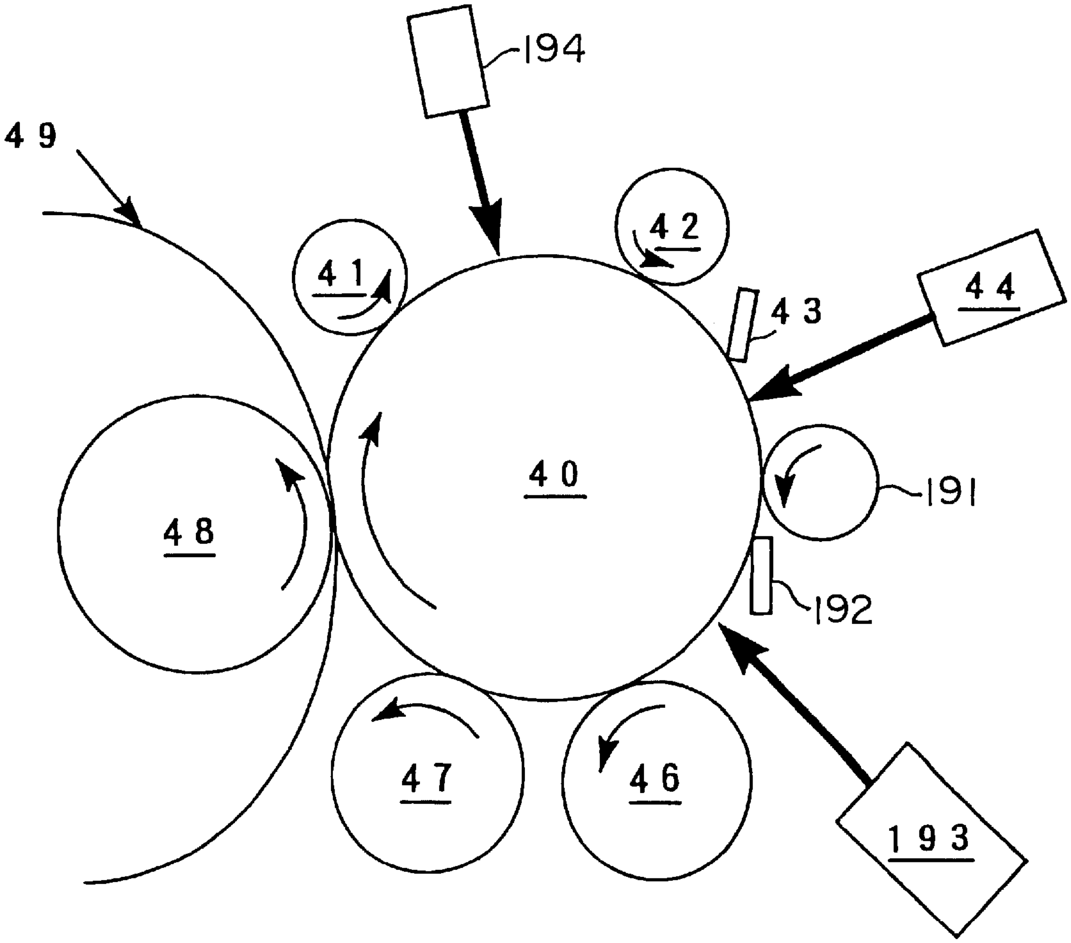
FIG. 19 is a schematic view showing an example of the image forming device according to the present invention.

An example of the image forming device provided with a curing device and a hysteresis erasing means is shown in FIG. 19. The device is provided with a member for supplying a curable substance 191, a member for leveling the supplied curable substance 192, a means for curing the curable substance 193, and a hysteresis erasing means 194, in addition to the equipment found in the image forming device as shown in FIG. 4. In the device illustrated in FIG. 19, a photocuring resin is used as the curable substance, and a light source for light exposure as the hysteresis erasing member.

In this device, the area where the latent image is not formed is cured by the curing device to improve the printing durability of the plate drum, by supplying the photocuring substance via the member 191 to the area where the image is not formed, leveling it by the member 192, then exposing it to light to cure by the member 193, before the plate drum 40 is developed after exposure in an image form.

Also, in this device, before the plate drum 40 is initialized after image transfer and subsequent cleaning, the hydrophobic layer in the area where the latent image is not formed is degenerated by the function of the photocatalytic layer which is activated by light emitted by the hysteresis erasing member 194.

When forming the same image repeatedly using this device, development is repeated after the steps of initialization, light exposure, curing, and development. During this process, the steps of hysteresis erasure, initialization, leveling, light exposure, and curing may be omitted. Once a series of image forming is over, the next process of hysteresis erasure, initialization, leveling, light exposure, and curing is implemented as necessary.

The image forming device as described above is an example of the image forming device according to the present invention. Individual members may be replaced with other ones such as those previously described.

<Pattern Forming Process>

The pattern forming process according to the present invention makes use of any of the photosensitive materials which are previously described.

Thus, the first pattern forming process according to the present invention is characterized by comprising:

(1) Preparing a photosensitive material comprising a photocatalytic layer comprising a photocatalyst and a hydrophobic layer applied on top of said photocatalytic layer, wherein said photocatalyst, when exposed to light, changes the angle of contact with water in the area on the surface of the photosensitive material which is exposed to light, thereby differentiating from the angle of contact with water in the area which is not exposed to light;

(2) Leveling the angle of contact with water on the surface of said photosensitive material by leveling the thickness of the hydrophobic layer;

(3) Exposing said photosensitive material to light to form a latent image which is more hydrophilic than the area not exposed to light; and (4) Adhering aqueous solution containing metallic ions to the formed latent image to deposit metal or metal oxide by a suitable method.

The second pattern forming process according to the present invention is characterized by using, in lieu of the aforementioned photosensitive material as used in the first pattern forming process, a photosensitive material comprising a hydrophobic photosensitive layer comprising a photocatalyst and an organic compound, wherein said photocatalyst, when exposed to light, changes the angle of contact with water in the area on the surface of the photosensitive material which is exposed to light.

Thus, the pattern forming process according to the present invention differs in developing means from the image forming process as previously described. The pattern forming process according to the present invention is described hereafter, focusing on the difference from the image forming process as previously described.

In the pattern forming process, planar photosensitive materials are commonly used, as the same photosensitive material is rarely used for forming a number of patterns consecutively. One of the pattern forming processes according to the present invention using a planar photosensitive material is described below by referring to FIG. 20.

Figure 20:
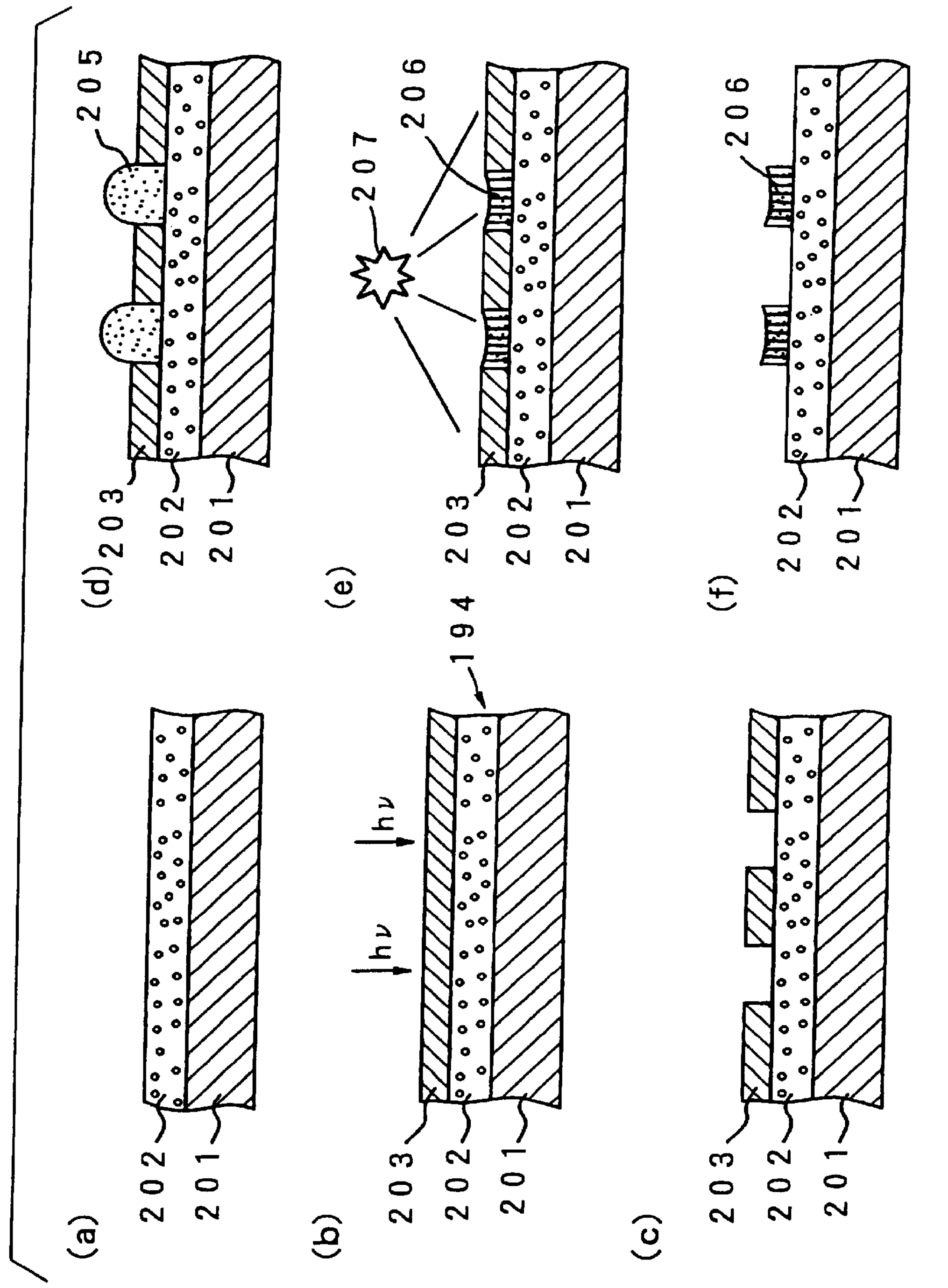
FIGS. 20(*a*)–20(*f*) are schematic diagrams showing the pattern forming process by the pattern forming process according to the present invention.

First, a substrate (FIG. 20(*a*)) having a photocatalytic layer 202 comprising a photocatalyst is prepared. After a hydrophobic layer 203 is formed on the surface of the substrate to make it a photosensitive material 204, its surface is initialized and exposed to light in an image form (FIG. 20(*b*)). The area on the surface of the photosensitive material which is exposed to light becomes more hydrophilic as a result of a chemical change due to the photocatalytic effect, changing its angle of contact with water.

In some cases, the hydrophobic substance which constitutes the hydrophobic layer may be lost due to chemical degeneration, as illustrated in FIG. 20(*c*), which shows a case where the hydrophobic layer has disappeared. In pattern forming, it is preferable that the hydrophobic layer be completely lost as shown in FIG. 20(*c*), as the formed pattern should have no shades and the metallic pattern should be firmly bound to the substrate.

By supplying aqueous solution containing metallic ion 205 to the photosensitive material on which a latent image has been formed, the aqueous solution adheres to the surface of the photosensitive material, following the image form (FIG. 20(*d*)).

After removing the aqueous solution adhering to the area where the latent image has not been formed as necessary using a squeezing member, the metallic ion in the aqueous solution is deposited as metal 206 or metallic oxide 206 by a suitable method. The metal or metallic oxide may be deposited by any method as appropriate, preferably by photoreduction, electroless plating, or electroplating. FIG. 20(*e*) shows photoreduction where the entire substrate is exposed to light emitted by the light source 207 to deposit metal. After forming a pattern of metal or metal oxide, the hydrophobic layer remaining on the substrate is removed as necessary to form a pattern (FIG. 20(*f*)). To remove the hydrophobic layer, the means previously described as hysteresis erasing means for the image forming process may be used.

Any aqueous solution containing metallic ions may be used as appropriate. When a pattern is intended for use as electric wiring, commercially available electroless plating solution, such as solution of gold, copper, nickel, tin, palladium, and other electroless plating solution may be used. When a pattern is intended for use as a hologram, solution in which silver nitrate, etc., is dissolved may be used.

EXAMPLES

Example 1

A liquid agent was prepared from $TiO_2$ sol with a secondary particle size of 50 nm and $SiO_2$ sol with a secondary particle size of 10 nm, which were mixed at a solid weight ratio of 50:50, by adjusting the mixture to a solids concentration of 10 wt % and pH 1.5. The liquid agent was applied to an aluminum drum by spray coating to a thickness of 3.5 $\mu$m to form a layer, which was then dried at 150° C. for 1 hour to obtain a plate drum 30 (i.e., a photosensitive material).

In the present example, an evaporator using an ultrasonic oscillator was used as the initiator 32 as shown in FIG. 4, and linoleic acid as the hydrophobicity enhancer.

In the present example, a blade-shaped member made of silicone rubber was used as the levelizer as shown in FIG. 9.

In the present example, an argon ion laser was used as the light source 34 for forming a latent image by exposure to an ultraviolet ray at a wavelength of 388 nm.

<Image Forming Device and Image Forming Process Therefor>

Images were formed using an image forming device as shown in FIG. 3, which was prepared from the above and other members. In the image forming device as shown in FIG. 3, an image forming process takes place while the plate drum rotates in the direction of an arrow as shown in the figure.

First, the hydrophobicity enhancer (linoleic acid) was applied to the plate drum 30 by the initializing member 32 to form a hydrophobic layer on the plate drum. The layer is then leveled to a uniform thickness by the leveling member 33. Next, the plate drum, on which a hydrophobic layer of a uniform thickness has been formed, is exposed to light in an image form by the light source 34. The hydrophobicity enhancer in the exposed area of the plate drum undergoes a chemical change, then is removed by treatment with the water roller 35. Then the ink supplying means 36 supplies ink to the plate drum. The ink adheres to the area from which the hydrophobicity enhancer has been removed, but also to the remaining area. The excess ink adhering to the remaining area is removed by the squeezing member 37. In the next step, the transfer member 38 presses the support 39 against the plate drum to transfer the ink from the plate drum to the support 39, producing a clear image. The remaining ink which has not been transferred to the support 39 is removed by the cleaning member 31 in the following step.

A clear image was thus obtained by using the image forming device according to the present invention. Also, in a subsequent procedure, the area on the plate drum which was used for forming the image was treated with the initializing member 32 and the leveling member 33 to initialize the entire surface of the plate drum to the hydrophobic state as it had been before light exposure. When another image was formed by repeating, from this state, the cycle consisting of exposure to light, supply of ink, transfer of ink to the support, cleaning, and initialization, the image was obtained with excellent reproducibility.

Example 2

When images were printed in the same manner as in Example 1, except that liquid paraffin was used instead of linoleic acid as the hydrophobicity enhancer for use in initialization, the images were obtained with excellent reproducibility.

Example 3

When images were printed in the same manner as in Example 1, except that a roller-shaped silicone foam member soaked up the hydrophobicity enhancer as shown in FIG. 6 was used as the initializing member, the images were obtained with excellent reproducibility.

Example 4

When images were printed in the same manner as in Example 1, except that a roller-shaped silicone foam member as shown in FIG. 11 was used as the leveling member, the images were obtained with excellent reproducibility.

Example 5

A liquid agent was prepared from $TiO_2$ sol with a secondary particle size of 50 nm and $SiO_2$ sol with a secondary particle size of 10 nm, which were mixed at a solid weight ratio of 50:50, by adjusting the mixture to a solids concentration of 10 wt % and pH 1.5, and adding a propanol solution of Zn porphyrin to the mixture so that the concentration of Zn porphyrin was 30 wt % of the total solids content of the liquid agent. The liquid agent was applied to an aluminum drum by draw-up coating to form a photocatalytic layer, which was then dried at 100° C. for a whole day and night. The cycle of coating and drying was repeated until the thickness of the photocatalytic layer as dried was 5 $\mu$m to prepare a plate drum.

After initialization, the obtained plate drum was exposed to He—Ne laser light at a wavelength of 543.5 nm in an image form, then treated with a water roller, which had been soaked with water, to clean the exposed area. Next, an ink roller immersed in an ink reservoir containing water-base ink was pressed against the plate drum to supply the water-base ink to the exposed area of the plate drum. Then, the plate drum was treated with a squeeze roller to remove excess ink adhering to the area of the plate drum which had not been exposed to light, and to control the thickness of the ink layer in the area which had been exposed to light. Finally, a clear image was obtained by pressing a transfer roller against the plate drum with paper in-between. The remaining ink on the plate drum which had not been transferred to the paper was removed by a cleaning roller. The entire plate drum was restored to an initialized state by initializing the area which had been exposed to light with an initializing roller.

When another image was printed by repeating the cycle consisting of exposure to light, supply of ink, transfer of ink to paper, cleaning, and initialization, the image was obtained with excellent reproducibility.

Also, when a gray pattern image was printed by changing the dose of light exposure with the laser, 20 shades of gray were obtained.

Example 6

A liquid agent was prepared from $TiO_2$ sol with a secondary particle size of 50 nm, which was adjusted to pH 0.8 with nitric acid, by adding a propanol solution of water-repellent siloxane clear coat resin, curing agent, and Zn porphyrin to the $TiO_2$ sol so that the concentration of $TiO_2$ was about 40 wt % of the total solids content of the liquid agent, the concentration of siloxane clear coat resin was about 30 wt % of the total solids content of the liquid agent, and the concentration of the Zn porphyrin used as the photocatalyst was about 30 wt % of the total solids content of the liquid agent. The liquid agent was applied to an aluminum drum by draw-up coating to form a photocatalytic layer, which was then dried at 100° C. for a whole day and night to prepare a plate drum having a photocatalytic layer whose thickness was 10 $\mu$m.

When images were printed in the same manner as in Example 5 using the above plate drum, the images were obtained with excellent reproducibility.

Also, when a gray pattern image was printed by changing the dose of light exposure with the laser, 20 shades of gray were obtained.

Example 7

A liquid agent was prepared from $TiO_2$ sol with a secondary particle size of 50 nm and $SiO_2$ sol with a secondary particle size of 10 nm, which were mixed at a solid weight ratio of 50:50, by adjusting the mixture to a solids concentration of 10 wt % and pH 1.5, and adding a propanol solution of Zn porphyrin to the mixture so that the concentration of Zn porphyrin was 30 wt % of the total solids content of the liquid agent. The liquid agent was applied to an aluminum drum by draw-up coating to form a photocatalytic layer, which was then dried at 100° C. for a whole day and night. The cycle of coating and drying was repeated until the thickness of the photocatalytic layer as dried was 5 μm to prepare a plate drum.

When images were printed in the same manner as in Example 5, except that a ZnO fluorescent head with a peak wavelength of 505 nm was used as the light source for light exposure, the images were obtained with excellent reproducibility.

Also, when a gray pattern image was printed by changing the dose of light exposure with the fluorescent head, 20 shades of gray were obtained.

Example 8

A liquid agent was prepared from $TiO_2$ sol with a secondary particle size of 50 nm, which was adjusted to pH 0.8 with nitric acid, by adding a propanol solution of water-repellent siloxane clear coat resin, curing agent, and Zn porphyrin to the $TiO_2$ sol so that the concentration of $TiO_2$ was about 40 wt % of the total solids content of the liquid agent, the concentration of siloxane clear coat resin was about 30 wt % of the total solids content of the liquid agent, and the concentration of the Zn porphyrin used as the photocatalyst was about 30 wt % of the total solids content of the liquid agent. The liquid agent was applied to an aluminum drum by draw-up coating to form a photocatalytic layer, which was then dried at 100° C. for a whole day and night to prepare a plate drum having a photocatalytic layer whose thickness was 10 μm.

When images were printed in the same manner as in Example 5 using the above plate drum, except that a ZnO fluorescent head with a peak wavelength of 505 nm was used as the light source for light exposure, the images were obtained with excellent reproducibility.

Also, when a gray pattern image was printed by changing the dose of light exposure with the fluorescent head, 20 shades of gray were obtained.

Example 9

A liquid agent was prepared from $TiO_2$ sol with a secondary particle size of 50 nm and $SiO_2$ sol with a secondary particle size of 10 nm, which were mixed at a solid weight ratio of 50:50, by adjusting the mixture to a solids concentration of 10 wt % and pH 1.5. The liquid agent was applied to an aluminum drum by spray coating to form a photocatalytic layer, which was then dried at 150° C. for 1 hour to prepare a plate drum having a photocatalytic layer whose thickness was 3.5 μm.

After initialization the obtained plate drum was exposed to ultraviolet light at a wavelength of 388 nm in an image form, then treated with a water roller which had been soaked with water to clean the exposed area. Next, an ink roller immersed in an ink reservoir containing water-base ink was pressed against the plate drum to supply the water-base ink to the exposed area of the plate drum. Then, the plate drum was treated with a squeeze roller to remove excess ink adhering to the area of the plate drum which had not been exposed to light, and to control the thickness of the ink layer in the area which had been exposed to light. Finally, a clear image was obtained by pressing a transfer roller against the plate drum with paper in-between to transfer the ink from the plate drum to the paper. The remaining ink on the plate drum which had not been transferred to the paper was removed by a cleaning roller. The entire plate drum was restored to an initialized state by initializing the area which had been exposed to light with an initializing roller.

When another image was printed by repeating the cycle consisting of exposure to light, supply of ink, transfer of ink to paper, cleaning, and initialization, the image was obtained with excellent reproducibility.

Example 10

A liquid agent was prepared from $TiO_2$ sol with a secondary particle size of 50 nm, which was adjusted to pH 0.8 with nitric acid, by adding a propanol solution of water-repellent siloxane clear coat resin and curing agent to the $TiO_2$ sol so that the concentration of $TiO_2$ was about 40 wt % of the total solids content of the liquid agent, and the concentration of siloxane clear coat resin was about 50 wt % of the total solids content of the liquid agent. The liquid agent was applied to an aluminum drum by draw-up coating to form a photocatalytic layer, which was then dried at 150° C. for 1 hour to prepare a plate drum having a photocatalytic layer whose thickness was 5 μm.

When images were printed in the same manner as in Example 9 using the above plate drum, the images were obtained with excellent reproducibility.

Example 11

A liquid agent was prepared from $TiO_2$ sol with a secondary particle size of 50 nm and $SiO_2$ sol with a secondary particle size of 10 nm, which were mixed at a solid weight ratio of 50:50, by adjusting the mixture to a solids concentration of 10 wt % and pH 1.5, and adding a propanol solution of Zn porphyrin to the mixture so that the concentration of Zn porphyrin was 30 wt % of the total solids content of the liquid agent. The liquid agent was applied to an aluminum drum by draw-up coating to form a photocatalytic layer, which was then dried at 100° C. for a whole day and night to prepare a plate drum having a photocatalytic layer whose thickness as dried was 5 μm.

When images were printed in the same manner as in Example 9, except that visible light at a wavelength of 532 nm was used for light exposure, the images were obtained with excellent reproducibility.

Example 12

A liquid agent was prepared from $TiO_2$ sol with a secondary particle size of 50 nm, which was adjusted to pH 0.8 with nitric acid, by adding a propanol solution of water-repellent siloxane clear coat resin, curing agent, and Zn porphyrin to the $TiO_2$ sol so that the concentration of $TiO_2$ was about 40 wt % of the total solids content of the liquid agent, the concentration of siloxane clear coat resin was about 30 wt % of the total solids content of the liquid agent, and the concentration of the Zn porphyrin used as the photocatalyst was about 30 wt % of the total solids content of the liquid agent. The liquid agent was applied to an aluminum drum by draw-up coating to form a photocatalytic layer, which was then dried at 100° C. for a whole day and night to prepare a plate drum having a photocatalytic layer whose thickness was 10 μm.

When images were printed in the same manner as in Example 9, except that visible light at a wavelength of 532.2 nm was used for light exposure, the images were obtained with excellent reproducibility.

Example 13

A liquid agent was prepared from $TiO_2$ sol with a secondary particle size of 50 nm and $SiO_2$ sol with a secondary particle size of 10 nm, which were mixed at a specified ratio, by adjusting the mixture to a solids concentration of 10 wt % and pH 1.5. The liquid agent was applied to an aluminum drum by spray coating to form a photocatalytic layer whose thickness was 3.5 μm, which was then dried at 150° C. for 1 hour to prepare a plate drum. After initialization, the obtained plate drum was exposed to ultraviolet light at a wavelength of 388 nm to write in data, then treated with a water roller which had been soaked with water to clean the area where data had been written. Next, an ink roller immersed in an ink reservoir was pressed against the plate drum to supply water-base ink to the hydrophilic area of the plate drum. Then, excess ink adhering to the area of the plate drum where no data had been written was removed with a squeeze roller. Finally, a clear image sample was obtained by pressing a transfer roller against the plate drum with paper in-between to transfer the ink from the plate drum to the paper. The remaining ink on the plate drum which had not been transferred to the paper was removed by the cleaning roller. The entire surface of the image forming material was restored to a hydrophobic state as it had been before data was written by treating with an initializing roller to change the hydrophilic area, where data had been written, back to a hydrophobic state. When another image sample was printed by repeating the process consisting of writing, supply of ink, transfer of ink to paper, cleaning, and initialization, the image was obtained with excellent reproducibility.

Example 14

A liquid agent was prepared from $TiO_2$ sol with a secondary particle size of 50 nm, which was adjusted to about pH 0.8 with nitric acid, by adding a propanol solution of water-repellent siloxane clear coat resin and curing agent to the $TiO_2$ sol so that the concentration of siloxane clear coat resin was about 50 wt % of the solids content of the $TiO_2$ sol. The liquid agent was applied to an aluminum drum by draw-up coating to form a photocatalytic layer, which was then dried at 150° C. for 1 hour to prepare a plate drum having a hydrophobic layer whose thickness was 5 μm. When image samples were printed in the same image printing process as in Example 13, the images were obtained with excellent reproducibility.

Example 15

A liquid agent was prepared from $TiO_2$ sol with a secondary particle size of 50 nm and $SiO_2$ sol with a secondary particle size of 10 nm, which were mixed at a specified ratio, by adjusting the mixture to a solids concentration of 10 wt % and pH 1.5, and adding a propanol solution of Zn porphyrin to the mixture. The liquid agent was applied to an aluminum drum by draw-up coating to form a hydrophobic photosensitive layer whose thickness was 10 μm, which was then dried at 100° C. for a whole day and night to prepare a plate drum. When images were printed in the same image printing process as in Example 13, except that visible light at a wavelength of 532 nm was used, the images were obtained with excellent reproducibility.

Example 16

A liquid agent was prepared from $TiO_2$ sol with a secondary particle size of 50 nm, which was adjusted to about pH 0.8 with nitric acid, by adding a propanol solution of water-repellent siloxane clear coat resin, curing agent, and Zn porphyrin to the $TiO_2$ sol so that the concentration of siloxane clear coat resin was about 30 wt % of the solids content of the $TiO_2$ sol, and the concentration of the Zn porphyrin used as the sensitizer for photocatalyst was also about 30 wt % of the solids content of the $TiO_2$ sol. The liquid agent was applied to an aluminum drum by draw-up coating to form a layer, which was then dried at 100° C. for a whole day and night to prepare a plate drum having a hydrophobic photosensitive layer whose thickness was 10 μm. When image samples were printed in the same image printing process as in Example 13, except that visible light at a wavelength of 532 nm was used, the images were obtained with excellent reproducibility.

Example 17

A titanium pipe, 30 mm in diameter, 250 mm in length, and 1 mm in thickness, was heated in air to form a titanium oxide layer on the surface thereof to prepare a plate drum having a photocatalytic titanium oxide layer on the surface thereof. After initialization, the plate drum was exposed to ultraviolet light at a wavelength of 388 nm to write in data, then treated with a water roller which had been soaked with water to clean the area where data had been written. Next, an ink roller immersed in an ink reservoir was pressed against the plate drum to supply water-base ink to the hydrophilic area of the plate drum. Then, excess ink adhering to the area of the plate drum where no data had been written was removed with a squeeze roller. Finally, a clear image sample was obtained by pressing a transfer roller against the plate drum with paper in-between to transfer the ink from the plate drum to the paper. The remaining ink on the plate drum which had not been transferred to the paper was removed by the cleaning roller. The entire surface of the image forming material was restored to a hydrophobic state as it had been before data was written, by treating with an initializing roller to change the hydrophilic area, where data had been written, back to a hydrophobic state. When another image sample was printed by repeating the process consisting of writing, supply of ink, transfer of ink to paper, cleaning, and initialization, the image was obtained with excellent reproducibility.

Example 18

A liquid agent was prepared from $TiO_2$ sol with a secondary particle size of 50 nm and $SiO_2$ sol with a secondary particle size of 10 nm, which were mixed at a specified ratio, by adjusting the mixture to a solids concentration of 10 wt % and pH 1.5. The liquid agent was applied to an aluminum drum by spray coating to form a layer whose thickness was 3.2 μm, which was then dried at 150° C. for 1 hour to prepare a plate drum. An image was formed as follows using the above plate drum installed on the image forming device as shown in FIG. 4. First, a hydrophobic layer was formed on the plate drum by using the initializing roller. The plate drum was then exposed to ultraviolet light at a wavelength of 388 nm to write in data, then treated with a water roller which had been soaked with water to clean the area where data had been written. Next, an ink roller immersed in an ink reservoir was pressed against the plate drum to supply water-base ink to the hydrophilic area of the image forming material. Then, excess ink adhering to the area of the plate drum where no data had been written was removed with a squeeze roller. Finally, a clear image sample was obtained by pressing a transfer roller against the plate drum with paper in-between to transfer the ink from the plate drum to the paper. The remaining ink on the plate drum which had not been transferred to the paper was removed by the cleaning roller. Afterwards, the hydrophobic substance which had not been degenerated was artificially degenerated by exposing to light using a hysteresis erasing device comprising a 20 W ultraviolet lamp, which resembled a fluorescent lamp in the shape as shown in FIG. 4 B. When another image sample was printed by repeating the process consisting of initialization, writing, supply of ink, transfer of ink to paper, cleaning, and hysteresis erasure, the image was obtained with excellent reproducibility. The image density as measured with a Macbeth densitometer was 1.48. No greasing was observed.

Example 19

A liquid agent was prepared from $TiO_2$ sol with a secondary particle size of 50 nm and $SiO_2$ sol with a secondary particle size of 10 nm, which were mixed at a specified ratio, by adjusting the mixture to a solids concentration of 10 wt % and pH 1.5. The liquid agent was applied to an aluminum drum by spray coating to form a layer whose thickness was 3.2 $\mu$m, which was then dried at 150° C. for 1 hour to prepare a plate drum. An image was formed as follows using the above plate drum installed on the image forming device as shown in FIG. 4. First, a hydrophobic layer was formed on the plate drum by using the initializing roller. The plate drum was then exposed to ultraviolet light at a wavelength of 388 nm to write in data, then treated with a water roller which had been soaked with water to clean the area where data had been written. Next, an ink roller immersed in an ink reservoir was pressed against the plate drum to supply water-base ink to the hydrophilic area of the plate drum. Then, excess ink adhering to the area of the plate drum where no data had been written was removed with a squeeze roller. Finally, a clear image sample was obtained by pressing a transfer roller against the plate drum with paper in-between to transfer the ink from the plate drum to the paper. Afterwards, the hydrophobic substance which had not been degenerated was artificially degenerated by exposing to light using a hysteresis erasing device comprising a 20 W ultraviolet lamp, which resembled a fluorescent lamp in the shape as shown in FIG. 4 A. The remaining ink on the plate drum which had not been transferred to the paper was removed by the cleaning roller. When another image sample was printed by repeating the process consisting of initialization, writing, supply of ink, transfer of ink to paper, hysteresis erasure, and cleaning, the image was obtained with excellent reproducibility. The image density as measured with a Macbeth densitometer was 1.47. No greasing was observed.

Example 20

The process is explained by referring to FIG. 4. A liquid agent was prepared from $TiO_2$ sol with a secondary particle size of 50 nm and $SiO_2$ sol with a secondary particle size of 10 nm, which were mixed at a specified ratio, by adjusting the mixture to a solids concentration of 10 wt % and pH 1.5. The liquid agent was applied to an aluminum drum by spray coating to form a layer whose thickness was 4.2 $\mu$m, which was then dried at 150° C. for 1 hour to prepare a plate drum. An image was formed as follows using the above plate drum installed on the image forming device as shown in FIG. 4.

First, a hydrophobic layer was formed on the plate drum 40 by using the initializing roller 42. The plate drum was then exposed to ultraviolet light at a wavelength of 388 nm, which was emitted by a light source 44 to write in image data, then treated with a water roller 45 which had been soaked with water to clean the area where data had been written. Next, an ink roller 46 immersed in an ink reservoir was pressed against the plate drum 40 to supply water-base ink to the hydrophilic area of the plate drum. Then, excess ink adhering to the area of the plate drum where no data had been written was removed with a squeeze roller 47. Finally, a clear image sample was obtained by pressing a transfer roller 48 against the plate drum with paper 49 in-between to transfer the ink from the plate drum to the paper. Afterwards, the hydrophobic substance which had not been degenerated was artificially degenerated by exposing to light using a hysteresis erasing device comprising a 10 W ultraviolet lamp, which resembled a fluorescent lamp in shape as shown in FIG. 4 A. The remaining ink on the plate drum which had not been transferred to the paper was removed by the cleaning roller. Then, the hydrophobic substance which had not been degenerated was artificially degenerated by exposing to light using a hysteresis erasing device comprising a 10 W ultraviolet lamp, which resembled a fluorescent lamp in the shape as shown in FIG. 4 B. When another image sample was printed by repeating the process consisting of initialization, writing, supply of ink, transfer of ink to paper, hysteresis erasure, cleaning, and hysteresis erasure, the image was obtained with excellent reproducibility. The image density as measured with a Macbeth densitometer was 1.47. No greasing was observed.

Example 21

The hysteresis erasing device as used in Example 18 was changed to the construction as shown in FIG. 15. The light source 151 emitted light using a nitrogen laser at a wavelength of 333.7 nm and an output of 1.2 W to a polygon mirror assembly 153, which rotated at a high speed to reflect the light to scan the plate drum over length. When images were printed repeatedly under the same conditions as in Example 18, images were obtained in the above process also with excellent reproducibility. The image density as measured with a Macbeth densitometer for the image obtained by the above process was 1.46. No greasing was observed.

Example 22

The hysteresis erasing device as used in Example 18 was changed to the construction as shown in FIG. 15. The light source 151 emitted light using a He—Cd laser at a wavelength of 330 nm and an output of 55 mW to a polygon mirror assembly 153, which rotated at a high speed to reflect the light to scan the plate drum over length. When images were printed repeatedly under the same conditions as in Example 18, images were obtained in the above process also with excellent reproducibility. The image density as measured with a Macbeth densitometer for the image obtained by the above process was 1.4. No greasing was observed.

Example 23

The hysteresis erasing device as used in Example 18 was changed to the construction as shown in FIG. 15. The light source 151 emitted light using a semiconductor laser at a wavelength of 440 nm and an output of 5 mW to a polygon mirror assembly 153, which rotated at a high speed to reflect the light to scan the plate drum over length. When images were printed repeatedly under the same conditions as in Example 18, images were obtained in the above process also with excellent reproducibility. The image density as measured with a Macbeth densitometer for the image obtained by the above process was 1.42. No greasing was observed.

Example 24

The hysteresis erasing device as used in Example 18 was changed to the construction as shown in FIG. 16. The light source 151 emitted light using LED's with a diameter of $\phi$5 arranged at 1 mm intervals over length, at a wavelength of 420 nm and an output of 1500 mcd. When images were printed repeatedly under the same conditions as in Example 18, images were obtained in the above process also with excellent reproducibility. The image density as measured with a Macbeth densitometer for the image obtained by the above process was 1.44. No greasing was observed.

Example 25

The hysteresis erasing device as used in Example 18 was changed to the construction as shown in FIG. 16. The light source 151 emitted light using an ultraviolet EL illuminant, such as one based on $ZnF_2$:$Cd^{3+}$. When images were printed repeatedly, images were obtained in the above process also with excellent reproducibility. The image density as measured with a Macbeth densitometer for the image obtained by the above process was 1.48. No greasing was observed.

Example 26

The hysteresis erasing device as used in Example 18 was changed to the construction as shown in FIG. 17. The light source 151 emitted light using a ball-shaped mercury lamp to a quartz lens, which condensed the light to a rectangular shape to expose the plate drum. When images were printed repeatedly under the same conditions as in Example 18, images were obtained in the above process also with excellent reproducibility. The image density as measured with a Macbeth densitometer for the image obtained by the above process was 1.41. No greasing was observed.

Example 27

The hysteresis erasing device as used in Example 18 was changed to the construction as shown in FIG. 18, which shows an oblique view from the side. The light source 181, capable of emitting white light pulses continuously using a xenon lamp, was provided with a semicylindrical cover having a mirror on the inside to improve light condensation, and driven by a high-voltage power supply (not shown in the figure). When images were printed repeatedly, images were obtained in the above process also with excellent reproducibility. The image density as measured with a Macbeth densitometer for the image obtained by the above process was 1.4. No greasing was observed.

Example 28

A liquid agent was prepared from $TiO_2$ sol with a secondary particle size of 50 nm and $SiO_2$ sol with a secondary particle size of 10 nm, which were mixed at a specified ratio, by adjusting the mixture to a solids concentration of 10 wt % and pH 1.5. The liquid agent was applied to a flat SUS sheet by dip coating to form a layer whose thickness was 4.7 $\mu$m, which was then dried at 150° C. for 1 hour to prepare a plate sheet. An image was formed using the above plate sheet in the process as shown in FIG. 3.

First, in the initializing step, a hydrophobic layer was formed on the plate sheet by using the initializing roller. The plate sheet was then exposed to ultraviolet light at a wavelength of 388 nm through a mask image to write in image data in the latent image forming step. Next, water-base ink was supplied by an ink roller to the hydrophilic area in the developing step. Finally, a clear image sample was obtained by pressing a transfer roller against the plate sheet with paper in-between to transfer the ink from the plate sheet to the paper in the transfer step. Afterwards, the hydrophobic substance which had not been degenerated was artificially degenerated by exposing to light using a hysteresis erasing device comprising a 20 W ultraviolet lamp. When image samples were printed by repeating the process consisting of the initializing step, latent image forming step, developing step, transfer step, and hysteresis erasing step for 200 cycles, the images were obtained with excellent reproducibility. The image density of the images thus obtained as measured with a Macbeth densitometer was consistently 1.45. No greasing was observed.

Reference 1

When the hysteresis erasing step was omitted in the process according to Example 28, a drop in density was observed in the third print and, in the 200th print, the image density fell to 0.55. The fall is presumably because the thickness of the hydrophobic layer which was applied in the initializing step gradually increased with repeated image forming, hampering the generation of a hydrophilic area on the plate sheet where hydrophilic ink can adhere.

Reference 2

When the hysteresis erasing step was omitted in the process according to Example 18, a drop in density was observed in the fourth print and, in the 200th print, the image density fell to 0.21. The fall is presumably because the thickness of the hydrophobic layer which was applied in the initializing step gradually increased with repeated image forming, hampering the generation of a hydrophilic area on the plate sheet where hydrophilic ink can adhere.

Example 29

A liquid agent for a hydrophobic photosensitive layer was prepared from $TiO_2$ particulates with a secondary particle size of 50 nm and linoleic acid, which were mixed at a weight ratio of 50:50. The liquid agent for the hydrophobic photosensitive layer thus prepared was supplied to a layer-forming roller so that a hydrophobic photosensitive layer could be formed on the substrate using the plate roller (i.e., initializing member). The image forming material, on which a hydrophobic photosensitive layer had been formed, was exposed to ultraviolet light at a wavelength of 388 nm to write in data, then treated with a water roller which had been soaked with water to clean the area on the image forming material where data had been written. Next, an ink roller immersed in an ink reservoir was pressed against the image forming material to supply water-base ink to the hydrophilic area of the image forming material. Then, excess ink adhering to the area of the image forming material where no data had been written was removed with a squeeze roller. Finally, a clear image sample was obtained by pressing a transfer roller against the image forming material with paper in-between to transfer the ink from the image forming material to the paper. The remaining ink on the image forming material which had not been transferred to the paper was removed by the cleaning roller. The hydrophilic area of the image forming material where no data had been written can be restored to a hydrophobic state by treating again with the layer-forming roller. In other words, the image forming material can be reinitialized by supplying the liquid agent for the hydrophobic photosensitive layer via the layer-forming roller and leveling the layer. When another image sample was printed by repeating the process consisting of writing, supply of ink, transfer of ink to paper, cleaning, and initialization, the image was obtained with excellent reproducibility.

Example 30

When image samples were printed in the same image printing process as in Example 29, except that $TiO_2$ particulates with a secondary particle size of 50 nm and liquid paraffin, which were mixed at a weight ratio of 50:50, were used as the liquid agent for hydrophobic photosensitive layer, the images were obtained with excellent reproducibility.

Example 31

When image samples were printed in the same image printing process as in Example 29, except that $TiO_2$ particulates with a secondary particle size of 50 nm, palmitic acid, and Zn porphyrin as a sensitizer, which were mixed at a weight ratio of 45:45:10, were used as the liquid agent for the hydrophobic photosensitive layer, and that visible light at a wavelength of 532 nm was used for light exposure, the images were obtained with excellent reproducibility.

Example 32

A liquid agent was prepared from $TiO_2$ sol with a secondary particle size of 50 nm and $SiO_2$ sol with a secondary particle size of 10 nm, which were mixed at a solid weight ratio of 50:50, by adjusting the mixture to a solids concentration of 10 wt % and pH 1.5. The liquid agent was applied to an aluminum drum by spray coating to a thickness of 1 μm to form a layer, which was then dried at 150° C. for 1 hour to obtain a plate drum.

In the present example, an evaporator using an ultrasonic oscillator was used as the initiator 32 as shown in FIG. 6, and palmitic acid as the hydrophobicity enhancer.

In the present example, a blade-shaped member made of silicone rubber was used as the levelizer 33 as shown in FIG. 11.

In the present example, an argon ion laser at a wavelength of 363.8 nm was used as the light source 34 for forming a latent image.

In the present example, an ultraviolet fluorescent lamp was used as the light source for erasing a latent image.

Images were formed using an image forming device as shown in FIG. 4, which was prepared from the above and other members. In the image forming device as shown in FIG. 4, an image forming process takes place while the plate drum rotates in the direction of an arrow as shown in the figure.

First, the hydrophobicity enhancer (palmitic acid) was applied to the plate drum 30 by the initializing member 32 to form a hydrophobic layer on the plate drum. The layer is then leveled to a uniform thickness by the leveling member 33. Next, the plate drum, on which a hydrophobic layer of a uniform thickness has been formed, is exposed to light in an image form by the light source 34. The hydrophobicity enhancer in the exposed area of the plate drum undergoes a chemical change, then is removed by the degenerating reaction of the photocatalyst or by the heat of the laser, or by an abrasion of the laser. Then the ink supplying means 36 supplies ink to the plate drum. The ink adheres to the area from which the hydrophobicity enhancer has been removed, but also to the remaining area. The excess ink adhering to the remaining area is removed by the squeezing member 37. In the next step, the transfer member 38 presses the support 39 against the plate drum, producing a clear image. The remaining ink on the plate drum which has not been transferred to the support 39 is removed by the cleaning member 31 in the following step. Then, the entire photosensitive material, which has been cleaned, is exposed to light emitted by the ultraviolet fluorescent lamp so that the hydrophobicity enhancer is degenerated by the strong oxidizing power of the photocatalyst, to erase the latent image. A clear image was thus obtained by using the image forming device according to the present invention.

Also, in a subsequent procedure, the area on the plate drum which was used for forming the image was treated with the initializing member 32 and the leveling member 33 to initialize the entire surface of the plate drum to the hydrophobic state as it had been before light exposure. When another image was formed by repeating, from this state, the cycle consisting of exposure to light, supply of ink, transfer of ink to the support, cleaning, erasure of latent image by light exposure, and initialization, the image was obtained with excellent reproducibility.

Example 33

A liquid agent was prepared from $TiO_2$ sol with a secondary particle size of 50 nm, which was adjusted to about pH 0.8 with nitric acid, by adding a propanol solution of water-repellent siloxane clear coat resin and curing agent to the $TiO_2$ sol so that the concentration of $TiO_2$ was about 50 wt % of the total solids content of the liquid agent, and the concentration of siloxane clear coat resin was about 50 wt % of the total solids content of the liquid agent. The liquid agent was applied to an aluminum drum by draw-up coating to form a photocatalytic layer, which was then dried at 150° C. for 1 hour to prepare a plate drum having a photocatalytic layer whose thickness was 1.5 μm. When images were printed in the same manner as in Example 32 using the above plate drum, the images were obtained with excellent reproducibility.

Example 34

When images were printed in the same manner as in Example 32, except that a $CO_2$ laser was used as the exposing member 34 instead of an argon ion laser, the images were obtained with excellent reproducibility.

Example 35

When images were printed in the same manner as in Example 32, except that linoleic acid was used instead of palmitic acid as the hydrophobicity enhancer for use in initialization, the images were obtained with excellent reproducibility.

Example 36

When images were printed in the same manner as in Example 32, except that a roller-shaped silicone foam member soaked up the hydrophobicity enhancer as shown in FIG. 8 was used as the initializing member, the images were obtained with excellent reproducibility.

Example 37

When images were printed in the same manner as in Example 32, except that a roller-shaped silicone foam member as shown in FIG. 13 was used as the leveling member, the images were obtained with excellent reproducibility.

Example 38

When an image was printed in the same manner as in Example 1, except that organic-base ink was used instead of water-base ink, a negative image, i.e., the image of the area which was not exposed to light, was obtained with excellent reproducibility.

Example 39

A liquid agent was prepared from $TiO_2$ sol with a secondary particle size of 50 nm and $SiO_2$ sol with a secondary particle size of 10 nm, which were mixed at a solid weight ratio of 50:50, by adjusting the mixture to a solids concentration of 10 wt % and pH 1.5, and adding a propanol solution of Zn porphyrin to the mixture so that the concentration of Zn porphyrin was 30 wt % of the total solids content of the liquid agent. The liquid agent was applied to an aluminum drum by draw-up coating to form a photocatalytic layer, which was then dried at 100° C. for a whole day and night. The cycle of coating and drying was repeated until the thickness of the photocatalytic layer as dried was 1 μm to prepare a plate drum. When images were printed in the same manner as in Example 32, except that a He—Ne laser with a wavelength of 543.5 nm was used as the exposer for erasing the latent image instead of an ultraviolet fluorescent lamp, the images were obtained with excellent reproducibility.

Example 40

A liquid agent was prepared from $TiO_2$ sol with a secondary particle size of 50 nm and $SiO_2$ sol with a secondary particle size of 10 nm, which were mixed at a solid weight ratio of 50:50, by adjusting the mixture to a solids concentration of 10 wt % and pH 1.5. The liquid agent was applied to an aluminum drum by draw-up coating to form a photocatalytic layer, which was then dried at 100° C. for a whole day and night. The cycle of coating and drying was repeated until the thickness of the photocatalytic layer as dried was 1 μm to prepare a plate drum. An image was formed as follows using the above plate drum installed on the image forming device.

The procedure from forming a hydrophobic layer to forming a latent image by light exposure was the same as in Example 32. Then, photosensitive phenylenediacrylate resin was sprayed onto the photosensitive material and exposed to ultraviolet light at a wavelength that cures the photosensitive resin. A visual examination revealed that the photosensitive resin had cured and adhered exclusively to the hydrophobic layer of the photosensitive material.

A clear image was obtained by the same steps of initialization, leveling, and light exposure as in Example 32, followed by the steps of application of photosensitive resin and curing by light exposure, then by supply of ink and transfer of ink to paper. When the photosensitive material was used repeatedly, it proved to be highly durable to printing.

Also, when the entire photosensitive material was exposed to ultraviolet light after printing was over at a wavelength which induces degenerating reaction of the photocatalyst, the photocuring resin on the photosensitive material was degenerated by the strong oxidizing power of the photocatalyst, exposing the photocatalytic layer on the entire surface of the photosensitive material.

When the above process was followed by the steps of initialization, leveling, light exposure, application of photosensitive resin, and curing by light exposure, and subsequently by the steps of supply of ink and transfer of ink to paper, an image was obtained with excellent reproducibility.

Example 41

A liquid agent was prepared from $TiO_2$ sol with a secondary particle size of 50 nm and $SiO_2$ sol with a secondary particle size of 10 nm, which were mixed at a solid weight ratio of 50:50, by adjusting the mixture to a solids concentration of 10 wt % and pH 1.5, and adding a propanol solution of Zn porphyrin to the mixture so that the concentration of Zn porphyrin was about 30 wt % of the total solids content of the liquid agent. The liquid agent was applied to an aluminum drum by draw-up coating to form a photocatalytic layer, which was then dried at 100° C. for a whole day and night to prepare a plate drum having a photocatalytic layer whose thickness as dried was 1 μm. When images were printed in the same manner as in Example 40, the images were obtained with excellent reproducibility.

Example 42

A liquid agent was prepared from $TiO_2$ sol with a secondary particle size of 50 nm, which was adjusted to about pH 0.8 with nitric acid, by adding a propanol solution of water-repellent siloxane clear coat resin, curing agent, and Zn porphyrin to the $TiO_2$ sol so that the concentration of $TiO_2$ was about 40 wt % of the total solids content of the liquid agent, the concentration of siloxane clear coat resin was about 30 wt % of the total solids content of the liquid agent, and the concentration of the Zn porphyrin used as the photocatalyst was about 30 wt % of the total solids content of the liquid agent. The liquid agent was applied to an aluminum drum by draw-up coating to form a photocatalytic layer, which was then dried at 100° C. for a whole day and night to prepare a plate drum having a photocatalytic layer whose thickness was 1 μm. When images were printed in the same manner as in Example 40, the images were obtained with excellent reproducibility.

Example 43

When an image was printed in the same manner as in Example 40, except that organic-base ink was used instead of water-base ink, a negative image, i.e., the image of the area which was not exposed to light, was obtained with excellent reproducibility.

Example 44

When an image was printed in the same manner as in Example 32, except that cooling water was running inside the plate drum so that the drum surface temperature would not exceed 100° C., the image was obtained with excellent reproducibility. Latent images could be written on the plate drum twice as many times as on a non-cooled plate drum.

Example 45

A liquid agent was prepared from $TiO_2$ sol with a secondary particle size of 50 nm and $SiO_2$ sol with a secondary particle size of 10 nm, which were mixed at a solid weight ratio of 50:50, by adjusting the mixture to a solids concentration of 10 wt % and pH 1.5. The liquid agent was applied to an aluminum drum by spray coating to form a photocatalytic layer, which was then dried at 150° C. for 1 hour to prepare a plate drum having a photocatalytic layer whose thickness was 1.5 μm.

The obtained plate drum was exposed to a YAG laser beam in an image form, then treated with a water roller which had been soaked with water to clean the exposed area. Next, an ink roller immersed in an ink reservoir containing water-base ink was pressed against the plate drum to supply the water-base ink to the exposed area of the plate drum. Then, the plate drum was treated with a squeeze roller to remove excess ink adhering to the area of the plate drum which had not been exposed to light, and to control the thickness of the ink layer in the area which had been exposed to light. Finally, a clear image was obtained by pressing a transfer roller against the plate drum with paper in-between to transfer the ink from the plate drum to the paper. The remaining ink on the plate drum which had not been transferred to the paper was removed by a cleaning roller. The entire plate drum was restored to an initialized state by initializing the area which had been exposed to light with an initializing roller.

When another image was printed by repeating the cycle consisting of exposure to light, supply of ink, transfer of ink to paper, cleaning, and initialization, the image was obtained with excellent reproducibility.

Example 46

A liquid agent was prepared from $TiO_2$ sol with a secondary particle size of 50 nm and $SiO_2$ sol with a secondary particle size of 10 nm, which were mixed at a solid weight ratio of 50:50, by adjusting the mixture to a solids concentration of 10 wt % and pH 1.5, and adding a propanol solution of Zn porphyrin to the mixture so that the concentration of Zn porphyrin was about 30 wt % of the total solids content of the liquid agent. The liquid agent was applied to an aluminum drum by draw-up coating to form a photocatalytic layer, which was then dried at 100° C. for a whole day and night to prepare a plate drum having a photocatalytic layer whose thickness was 1 μm. When images were printed in the same manner as in Example 45 using the above plate drum, the images were obtained with excellent reproducibility.

Example 47

A liquid agent was prepared from $TiO_2$ sol with a secondary particle size of 50 nm, which was adjusted to about pH 0.8 with nitric acid, by adding a propanol solution of water-repellent siloxane clear coat resin, curing agent, and Zn porphyrin to the $TiO_2$ sol so that the concentration of $TiO_2$ was about 40 wt % of the total solids content of the liquid agent, the concentration of siloxane clear coat resin was about 30 wt % of the total solids content of the liquid agent, and the concentration of the Zn porphyrin used as the photocatalyst was about 30 wt % of the total solids content of the liquid agent. The liquid agent was applied to an aluminum drum by draw-up coating to form a photocatalytic layer, which was then dried at 100° C. for a whole day and night to prepare a plate drum having a photocatalytic layer whose thickness was 1 μm. When images were printed in the same manner as in Example 45 using the above plate drum, except that an argon ion laser was used as the light source member for light exposure, the images were obtained with excellent reproducibility.

Example 48

When an image was printed in the same manner as in Example 45, except that organic-base ink was used instead of water-base ink, a negative image, i.e., the image of the area which was not exposed to light, was obtained with excellent reproducibility.

Example 49

A liquid agent was prepared from $TiO_2$ sol with a secondary particle size of 50 nm and $SiO_2$ sol with a secondary particle size of 10 nm, which were mixed at a specified ratio, by adjusting the mixture to a solids concentration of 10 wt % and pH 1.5. The liquid agent was applied to a quartz substrate sheet by spin coating for 10 seconds at a rotation speed of 1500 rpm to form a photocatalytic layer whose thickness was 0.44 m. The layer was then dried at 150° C. for 1 hour and coated with oleic acid as a hydrophobicity enhancer to prepare an image forming material. The prepared image forming material was exposed to ultraviolet light at a wavelength of 388 nm using an $Ar^+$ laser to write in a latent image. Then, by applying 1 mM aqueous solution of silver nitrate to the latent image area and exposing the area to white light, a silver deposit was obtained. Finally, a pattern was formed by exposing the entire image forming material to an ultraviolet beam to degenerate the oleic acid in the area where silver had not deposited.

Example 50

An image forming material was prepared in the same manner as in Example 49. The image forming material was exposed to ultraviolet light using an $Ar^+$ laser at a wavelength of 388 nm to write in a latent image. Then, by applying commercially available electroless gold plating solution to the latent image area and allowing the area to stand until ingredient metal deposited, a gold deposit was obtained. Finally, a pattern was formed by exposing the entire image forming material to an ultraviolet beam to degenerate the organic substances in the area where gold had not deposited.

Example 51

A liquid agent was prepared from $TiO_2$ sol with a secondary particle size of 50 nm and $SiO_2$ sol with a secondary particle size of 10 nm, which were mixed at a specified ratio, by adjusting the mixture to a solids concentration of 10 wt % and pH 1.5, and adding a propanol solution of Zn porphyrin to the mixture. The liquid agent was applied to a quartz substrate sheet by spin coating for 10 seconds at a rotation speed of 1500 rpm to form a photocatalytic layer whose thickness was 0.4 μm. The layer was then dried at 150° C. for 1 hour and coated with oleic acid as a hydrophobicity enhancer to prepare an image forming material. The prepared image forming material was exposed to visible light at a wavelength of 532 nm using an Nd:YAG laser to form a pattern in the same manner as in Example 49.

Example 52

A liquid agent was prepared from $TiO_2$ sol with a secondary particle size of 50 nm, which was adjusted to about pH 0.8 with nitric acid, by adding a propanol solution of water-repellent siloxane clear coat resin, curing agent, and Zn porphyrin to the $TiO_2$ sol so that the concentration of siloxane clear coat resin was about 30 wt % of the solids content of the $TiO_2$ sol, and the concentration of the Zn porphyrin used as the sensitizer for photocatalyst was also about 30 wt % of the solids content of the $TiO_2$ sol. The liquid agent was applied to a quartz substrate sheet by draw-up coating to form a layer, which was then dried at 100° C. for a whole day and night to prepare a plate drum having a photosensitive layer whose thickness was 10 μm. The prepared image forming material was exposed to visible light at a wavelength of 532 nm using an Nd:YAG laser to form a pattern in the same manner as in Example 49.

Example 53

A liquid agent was prepared from $TiO_2$ sol with a secondary particle size of 50 nm and $SiO_2$ sol with a secondary particle size of 10 nm, which were mixed at a specified ratio, by adjusting the mixture to a solids concentration of 10 wt % and pH 1.5, by adding a propanol solution of Zn porphyrin to the mixture. The liquid agent was applied to a quartz substrate sheet by spin coating for 10 seconds at a rotation speed of 1500 rpm to form a photocatalytic layer whose thickness was 0.44 m. The layer was then dried at 150° C. for 1 hour and coated with oleic acid as a hydrophobicity enhancer to prepare an image forming material. The prepared image forming material was exposed to visible light at a wavelength of 532 nm using an Nd:YAG laser to write in a latent image. Then, by applying commercially available electroless gold plating solution to the latent image area and allowing the area to stand until ingredient metal deposited, a gold deposit was obtained. Finally, a pattern was formed by exposing the entire image forming material to an ultraviolet beam to degenerate the organic substances in the area where gold had not deposited.

What is claimed is:

1. An image forming device, comprising:

(a) a photosensitive material comprising a photocatalytic layer comprising a photocatalyst and a hydrophobic layer applied on top of said photocatalytic layer, wherein said photocatalyst, when exposed to light, changes the angle of contact with water in the area on the surface of the photosensitive material which is exposed to light, thereby differentiating from the angle of contact with water in the area which is not exposed to light;

(b) an initializer for leveling the hydrophobic layer so as to level the angle of contact with water on the surface of said photosensitive material;

(c) an exposer for forming a latent image on said photosensitive material, which has been initialized by the initializer; and (d) a developing device for developing the formed latent image.

2. A device according to claim 1, wherein the developing device supplied ink to the surface of the photosensitive material.

3. An image forming device according to claim 1, wherein the photocatalytic layer is formed on the surface of a metallic substrate.

4. An image forming device according to claim 1, wherein the initializer sprays the vapor of a hydrophobicity enhancer onto the surface of the photosensitive material to level the hydrophobic layer.

5. An image forming device according to claim 1, further comprising a levelizer for further uniformly thinning the hydrophobic layer, which has been leveled by the initializer.

6. An image forming device according to claim 5, wherein the levelizer is a blade-shape elastic member which contacts the photosensitive-material in a line or face for uniformly thinning the hydrophobic layer.

7. An image forming device according to claim 2, further comprising a pressing means for transferring an image by bringing into contact ink adhering to the photosensitive material and an image recording medium.

8. An image forming device according to claim 7, further comprising a hysteresis erasing member for erasing the hydrophobic layer remaining on the photosensitive material after an image is transferred to an image recording medium.

9. An image forming device according to claim 8, wherein the hysteresis erasing member removes the hydrophobic layer by exposure to light.

10. An image forming device, comprising:

(a) a photosensitive material comprising a photocatalytic layer comprising a photocatalyst and a hydrophobic layer applied on top of said photocatalytic layer, wherein said photocatalyst, when exposed to light, changes the angle of contact with water in the area on the surface of the photosensitive material which is exposed to light;

(b) an initializer for leveling the hydrophobic layer so as to level the angle of contact with water on the surface of said photosensitive material;

(c) an exposer for forming a latent image on said photosensitive material, which has been initialized by the initializer, by exposing said photosensitive material to light, capable of controlling the dose of light exposure; and (d) a developing device for developing the formed latent image by supplying ink to the surface of said photosensitive material so as to adhere ink to said latent image.

11. An image forming device, comprising:

(a) a photosensitive material comprising a photocatalytic layer comprising a photocatalyst and a hydrophobic layer applied on top of said photocatalytic layer, wherein said photocatalyst, when exposed to light, changes the angle of contact with water in the area on the surface of the photosensitive material which is exposed to light, thereby differentiating from the angle of contact with water in the area which is not exposed to light;

(b) an initializer for leveling the hydrophobic layer so as to level the angle of contact with water on the surface of said photosensitive material;

(c) an exposer for forming a latent image on said photosensitive material, which has been initialized by the initializer;

(d) a curing device for curing the hydrophobic layer in the area where the latent image is not formed; and (e) a developing device for developing the formed latent image.

12. An image forming device according to claim 11, wherein the curing device comprises selectively covering the area of the hydrophobic layer where the latent image has not been formed with a curable substance, then curing the curable substance.

13. An image forming device according to claim 11, wherein the curing device cures the curable substance by exposure to light.

14. An image forming device, comprising:

(a) a photosensitive material comprising a hydrophobic photosensitive layer comprising a photocatalyst and an organic compound, wherein said photocatalyst, when exposed to light, degenerates said organic compound to change the angle of contact with water in the area on the surface of the photosensitive material which is exposed to light, thereby differentiating from the angle of contact with water in the area which is not exposed to light;

(b) an exposer for forming a latent image on said photosensitive material; and (c) a developing device for developing the formed latent image.

15. An image forming device, comprising:

(a) a photosensitive material comprising a hydrophobic photosensitive layer comprising a photocatalyst and an organic compound, wherein said photocatalyst, when exposed to light, degenerates said organic compound to change the angle of contact with water in the area on the surface of the photosensitive material which is exposed to light, thereby differentiating from the angle of contact with water in the area which is not exposed to light;

(b) an exposer for forming a latent image on said photosensitive material, which has been initialized by the initializer, by exposing said photosensitive material to light, capable of controlling the dose of light exposure; and (c) a developing device for developing the formed latent image by supplying ink to the surface of said photosensitive material so as to adhere ink to said latent image.

16. An image forming device, comprising:

(a) a photosensitive material comprising a hydrophobic photosensitive layer comprising a photocatalyst and an organic compound, wherein said photocatalyst, when exposed to light, changes the angle of contact with water in the area on the surface of the photosensitive material which is exposed to light, thereby differentiating from the angle of contact with water in the area which is not exposed to light;

(b) an exposer for forming a latent image on said photosensitive material, which has been initialized by the initializer;

(c) a curing device for curing the hydrophobic layer in the area where the latent image is not formed; and (d) a developing device for developing the formed latent image.

17. An image forming device according to claim 16, wherein the curing device comprises selectively covering the area of the hydrophobic layer where the latent image has not been formed with a curable substance, then curing the curable substance.

18. An image forming device according to claim 17, wherein the curing device cures the curable substance by exposure to light.

* * * * *